United States Patent
Zhang et al.

(10) Patent No.: US 12,261,566 B2
(45) Date of Patent: Mar. 25, 2025

(54) PHOTOVOLTAIC SYSTEM

(71) Applicant: Huawei Digital Power Technologies Co., Ltd., Guangdong (CN)

(72) Inventors: Yanzhong Zhang, Shanghai (CN); Zhenhuan Shu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 480 days.

(21) Appl. No.: 17/575,537

(22) Filed: Jan. 13, 2022

(65) Prior Publication Data

US 2022/0140781 A1 May 5, 2022

Related U.S. Application Data

(63) Continuation of application No. PCT/CN2020/074487, filed on Feb. 7, 2020.

(51) Int. Cl.
*H02S 40/32* (2014.01)
*H02S 40/38* (2014.01)

(52) U.S. Cl.
CPC .............. *H02S 40/32* (2014.12); *H02S 40/38* (2014.12)

(58) Field of Classification Search
CPC .......... H02S 40/32; H02S 40/38; H02S 40/30; Y02E 10/56; Y02E 40/70; Y02E 60/00; Y02E 70/30; Y04S 10/123; Y04S 40/121; H02J 7/35; H02J 3/381; H02J 13/00007; H02J 1/102; H02J 2300/26

USPC ....................................................... 307/82
See application file for complete search history.

(56) References Cited

U.S. PATENT DOCUMENTS

| | | | |
|---|---|---|---|
| 9,136,710 B1 | 9/2015 | Baker et al. | |
| 10,090,701 B2 * | 10/2018 | Yamada | H02J 3/46 |
| 2014/0062209 A1 | 3/2014 | Liu et al. | |
| 2015/0160676 A1 | 6/2015 | Pan et al. | |
| 2017/0331267 A1 | 11/2017 | Delap et al. | |
| 2018/0110150 A1 | 4/2018 | Blanchet et al. | |
| 2018/0342873 A1 | 11/2018 | Wang et al. | |

(Continued)

FOREIGN PATENT DOCUMENTS

| | | |
|---|---|---|
| CN | 101702523 B | 8/2011 |
| CN | 104124703 A | 10/2014 |
| CN | 204068287 U | 12/2014 |

(Continued)

*Primary Examiner* — Richard Tan

(57) ABSTRACT

A photovoltaic system includes a plurality of photovoltaic strings, at least one junction device, and at least one inverter. Each photovoltaic string includes a first direct current output terminal, and is configured to generate a first direct current. Each junction device is coupled to the plurality of photovoltaic strings. Each junction device is configured to output second direct currents through second direct current output terminals of the junction device after converging a plurality of first direct currents. An $i^{th}$ junction device includes a plurality of second direct current output terminals. The $i^{th}$ junction device is configured to output a plurality of mutually independent second direct currents after converging a plurality of first direct currents, and i is a positive integer. A quantity of the plurality of second direct currents is less than a quantity of the plurality of first direct currents.

9 Claims, 14 Drawing Sheets

(56) References Cited

U.S. PATENT DOCUMENTS

2019/0052092 A1    2/2019  Palombini et al.
2021/0288514 A1*   9/2021  Wen .................. H02J 7/007182

FOREIGN PATENT DOCUMENTS

| | | | |
|---|---|---|---|
| CN | 105245018 | * | 1/2016 |
| CN | 106207821 A | | 12/2016 |
| CN | 106571646 | * | 4/2017 |
| CN | 107579698 A | | 1/2018 |
| CN | 206865155 U | | 1/2018 |
| CN | 109888819 | * | 6/2019 |
| CN | 109888819 A | | 6/2019 |
| CN | 110098635 A | | 8/2019 |
| CN | 110572184 A | | 12/2019 |
| CN | 110707743 A | | 1/2020 |
| CN | 111342483 | * | 6/2020 |
| DE | 10136147 | * | 2/2003 |
| EP | 3361591 A1 | | 8/2018 |
| JP | 2017011948 | * | 1/2017 |
| JP | 2019037136 | | 3/2019 |
| KR | 20130083837 | * | 8/2014 |
| WO | 2012147058 A1 | | 11/2012 |

* cited by examiner

PHOTOVOLTAIC SYSTEM

CROSS-REFERENCE TO RELATED APPLICATIONS

This application is a continuation of International Application No. PCT/CN2020/074487, filed on Feb. 7, 2020, the disclosure of which is hereby incorporated by reference in its entirety.

TECHNICAL FIELD

This application relates to the field of circuits, and more specifically, to a photovoltaic system.

BACKGROUND

In a photovoltaic power station, energy may be converted by using a centralized architecture, a distributed architecture, or a string architecture. In the centralized architecture and the distributed architecture, a junction device converges direct currents generated by photovoltaic strings, and transmits a converged direct current to an inverter. Due to a skin effect, a withstand current per unit area of a conducting wire used for current transmission is reduced. Costs of the conducting wire increase with an increase in the withstand current. Therefore, costs of a cable are relatively high when a current of electric energy output by the junction device is relatively high.

SUMMARY

This application provides a photovoltaic system. A junction device transmits direct currents to an inverter component through a plurality of outputs, so that a current of each output direct current of the junction device is reduced, and costs of a cable used to transmit the direct currents are reduced.

According to a first aspect, a photovoltaic system is provided, including a plurality of photovoltaic strings, at least one junction device, and at least one inverter. Each photovoltaic string includes a first direct current output terminal, and is configured to generate a first direct current. Each junction device is coupled to first direct current output terminals of at least two of the plurality of photovoltaic strings. Each junction device is configured to output second direct currents through second direct current output terminals of the junction device after converging a plurality of first direct currents. An $i^{th}$ junction device in the at least one junction device includes a plurality of second direct current output terminals. The $i^{th}$ junction device is configured to output a plurality of mutually independent second direct currents after converging the plurality of first direct currents, i is a positive integer, and for each junction device, a quantity of the plurality of second direct currents is less than a quantity of the plurality of first direct currents. The at least one inverter is configured to connect to the plurality of second direct current output terminals and convert the plurality of second direct currents into an alternating current.

The junction device converges direct currents generated by photovoltaic strings to form a plurality of direct currents, and a current of each direct current is reduced, so that a withstand current of a cable for transmitting the direct current can be reduced, thereby reducing cable costs.

Optionally, each junction device includes at least one direct current (direct current, DC)-DC conversion circuit, and each DC-DC conversion circuit performs DC-DC conversion on at least one first direct current.

Through DC-DC conversion, maximum power point tracking (maximum power point tracking, MPPT) can be performed on the direct currents generated by the photovoltaic strings, thereby improving power generation efficiency of the photovoltaic system.

With reference to the first aspect, in some possible implementations, the photovoltaic system includes a transmission apparatus, the transmission apparatus includes a transmission node and a plurality of third direct current output terminals, and the at least one inverter includes a plurality of inverters. The transmission apparatus is coupled to the at least one junction device. The transmission apparatus is configured to transmit, to the transmission node, the at least one second direct current output by the at least one junction device. The transmission node is coupled to the plurality of third direct current output terminals. Each third direct current output terminal is coupled to one of the at least one inverter.

The plurality of second direct currents output by the junction device are transmitted to the transmission node, that is, are converged at the transmission node, and direct currents of the transmission node are transmitted to a plurality of inverters. When some inverters are faulty, another inverter can invert the direct currents of the transmission node, thereby improving electric energy transmission efficiency. In other words, the transmission node is coupled to a plurality of inverters, so that even when some inverters are faulty, electric energy transmission efficiency of the at least one inverter can be improved, thereby improving power generation efficiency of the photovoltaic system.

With reference to the first aspect, in some possible implementations, the photovoltaic system includes an energy storage apparatus, and the transmission node is coupled to the energy storage apparatus.

The energy storage apparatus may store power of the transmission node when the power of the transmission node is greater than maximum conversion power of the inverter, thereby improving electric energy utilization.

The transmission node may receive second direct currents output by a plurality of junction devices or a plurality of second direct current output terminals of the junction device. The transmission node is coupled to the energy storage apparatus, and the plurality of junction devices may be configured to charge the energy storage apparatus. One energy storage apparatus corresponds to a plurality of junction devices, or may correspond to a plurality of second direct current output terminals, so that a quantity of energy storage devices can be reduced, utilization of the energy storage device can be improved, and charging efficiency can be improved.

With reference to the first aspect, in some possible implementations, each inverter is configured to connect to at least one second direct current output terminal of one junction device, and convert received at least one second direct current into an alternating current. Each junction device includes at least one direct current DC-DC conversion circuit. Each direct current DC-DC conversion circuit is coupled to a first direct current output of at least one photovoltaic string, and is configured to perform DC-DC conversion on the at least one first direct current.

An inverter device receives all or some of direct current outputs of only one junction device, thereby reducing a granularity of the inverter and reducing impact of an inverter device fault on conversion efficiency of the inverter device.

An inversion function and a DC-DC conversion function are implemented by using two devices, so that environment adaptability of the photovoltaic system is improved, and mounting flexibility is improved.

With reference to the first aspect, in some possible implementations, the at least one inverter is in a one-to-one correspondence with the at least one junction device.

Usually, each inverter device includes one inverter. Inverters are in a one-to-one correspondence with junction devices. If some inverters or some junction devices are faulty, operation of another branch circuit connecting a junction device and an inverter is not affected. One inverter is used to invert all direct currents output by one junction device, so that a quantity of inverters in the photovoltaic system is reduced, thereby reducing costs.

With reference to the first aspect, in some possible implementations, the photovoltaic system includes an alternating current node and at least one energy storage apparatus, and a quantity of the at least one inverter is greater than a quantity of the at least one energy storage apparatus. The alternating current node is coupled to an alternating current terminal that is of each inverter and that is configured to output an alternating current. A direct current terminal that is of a $j^{th}$ inverter in the at least one inverter and that is configured to receive a direct current is coupled to a $j^{th}$ energy storage apparatus in the at least one energy storage apparatus. When the $j^{th}$ inverter charges the $j^{th}$ energy storage apparatus, the $j^{th}$ inverter is configured to rectify an alternating current to form a fourth direct current, where j is a positive integer, and the $j^{th}$ energy storage apparatus is configured to store the fourth direct current.

Alternating current terminals of the plurality of inverter components in the photovoltaic system are coupled to the transmission node, and direct current terminals of some inverter components are coupled to the energy storage apparatus. In this way, some inverter components may operate reversely to rectify an alternating current of the transmission node, thereby reducing a quantity of coupled energy storage apparatuses.

It should be understood that when direct current terminals of the plurality of inverter components are coupled to a same node, the same node may be coupled to one energy storage apparatus. When a plurality of inverter components in the photovoltaic system are coupled to a plurality of nodes, each of some of the plurality of nodes may be coupled to one energy storage apparatus. An inverter component that is not coupled to the energy storage apparatus inverts electric energy generated by the photovoltaic string, and transmits the inverted electric energy to the alternating current node. All or some inverter components that are coupled to the energy storage apparatus may rectify an alternating current of the alternating current node.

The alternating current node may be coupled to a transformer. The transformer may transmit the alternating current of the alternating current node to a power grid. Alternatively, the transformer may transmit an alternating current of a power grid to the alternating current node. In other words, the alternating current of the alternating current node may include an alternating current output by the transformer.

With reference to the first aspect, in some possible implementations, the at least one inverter includes one inverter, and the inverter is configured to connect to the at least one junction device.

With reference to the first aspect, in some possible implementations, at least one inverter device is included. Each inverter device includes at least one inverter. Each inverter device is configured to communicate, through power line communication PLC, with at least one junction device coupled to the inverter device.

Communication through the power line carrier can reduce costs.

According to a second aspect, a photovoltaic system is provided, including a plurality of photovoltaic strings, at least one junction device, a transmission apparatus, and a plurality of inverters. Each photovoltaic string includes a first direct current output terminal, and is configured to generate a first direct current. Each junction device is coupled to the first direct current output terminals of the plurality of photovoltaic strings. Each junction device includes at least one second direct current output terminal, and is configured to converge a plurality of first direct currents into at least one second direct current. A quantity of the at least one second direct currents is less than a quantity of the plurality of first direct currents. The transmission apparatus includes a transmission node and a plurality of third direct current output terminals. The transmission apparatus is coupled to the at least one junction device. The transmission apparatus is configured to transmit, to the transmission node, the at least one second direct current output by the at least one junction device. The transmission node is coupled to the plurality of third direct current output terminals. Each third direct current output terminal is coupled to one inverter in a plurality of inverters. The plurality of inverters is configured to convert a direct current of the transmission node into an alternating current.

It should be understood that each third direct current output terminal is configured to transmit the direct current of the transmission node to the inverter coupled to the third direct current output terminal.

A plurality of second direct currents output by the junction device are transmitted to the transmission node, that is, the direct current at the transmission node is obtained by converging the plurality of second direct currents. The direct current at the transmission node is transmitted to a plurality of inverters. When one inverter is faulty, another inverter can invert the direct current of the transmission node, thereby improving electric energy transmission efficiency. In other words, the transmission node is coupled to a plurality of inverters, so that even when some inverters are faulty, electric energy transmission efficiency can be improved.

With reference to the second aspect, in some possible implementations, the transmission node is coupled to an energy storage apparatus.

The transmission node may receive a plurality of second direct currents. The transmission node is coupled to the energy storage apparatus, so that a quantity of energy storage apparatuses can be reduced, thereby reducing costs.

With reference to the second aspect, in some possible implementations, an $i^{th}$ junction device in the at least one junction device includes a plurality of second direct current output terminals, and the $i^{th}$ junction device is configured to output a plurality of mutually independent second direct currents after converging the plurality of first direct currents.

The junction device converges direct currents generated by photovoltaic strings to form a plurality of direct currents, and a current of each direct current is reduced, so that a withstand current of a cable for transmitting the direct current can be reduced, thereby reducing cable costs.

With reference to the second aspect, in some possible implementations, the photovoltaic system includes at least one inverter device. Each inverter device includes at least one inverter. Each inverter device is configured to communicate, through power line communication PLC, with at least one junction device coupled to the inverter device.

According to a third aspect, a photovoltaic system is provided, including a plurality of photovoltaic strings, at least one junction device, and at least one inverter. Each photovoltaic string includes a first direct current output terminal, and is configured to generate a first direct current. Each junction device includes at least one direct current DC-DC conversion circuit and at least one second direct current output terminal. Each direct current DC-DC conversion circuit is coupled to a first direct current output of at least one photovoltaic string, and is configured to perform DC-DC conversion on at least one first direct current. Each junction device is configured to converge the plurality of first direct currents to form at least one second direct current. A quantity of the at least one second direct current is less than a quantity of the plurality of first direct currents. Each inverter is coupled to at least one second direct current output terminal of one of the at least one junction device, and converts received at least one second direct current into an alternating current.

An inverter device receives all or some of direct current outputs of only one junction device, thereby reducing a granularity of the inverter and reducing impact of an inverter device fault on conversion efficiency of the inverter device.

An inversion function and a DC-DC conversion function are implemented by using two devices, so that environment adaptability of the photovoltaic system is improved, and mounting flexibility is improved.

With reference to the third aspect, in some possible implementations, an $i^{th}$ junction device in the at least one junction device includes a plurality of second direct current output terminals, and the $i^{th}$ junction device is configured to output a plurality of mutually independent second direct currents after converging the plurality of first direct currents, where i is a positive integer.

The junction device outputs a plurality of independent direct currents through a plurality of direct current output terminals, so that costs of a conducting wire for energy transmission between the junction device and the inverter can be reduced. It should be understood that one direct current may also be output through one or more direct current output terminals. Preferably, the plurality of direct current output terminals may be in a one-to-one correspondence with the plurality of independent direct currents.

With reference to the third aspect, in some possible implementations, the photovoltaic system includes an alternating current node and at least one energy storage apparatus, and a quantity of the at least one inverter is greater than a quantity of the at least one energy storage apparatus. The alternating current node is coupled to an alternating current terminal that is of each inverter and that is configured to output an alternating current. A direct current terminal that is of a $j^{th}$ inverter in the at least one inverter and that is configured to receive a direct current is coupled to a $j^{th}$ energy storage apparatus in the at least one energy storage apparatus, where j is a positive integer. When the $j^{th}$ inverter charges the $j^{th}$ energy storage apparatus, the $j^{th}$ inverter is configured to rectify an alternating current to form a fourth direct current, where j is a positive integer, and the $j^{th}$ energy storage apparatus is configured to store the fourth direct current.

With reference to the third aspect, in some possible implementations, the electric energy conversion apparatus, such as the at least one inverter, includes a transformer. The alternating current node is coupled to the transformer. An alternating current of the alternating current node includes an alternating current output by the transformer.

With reference to the third aspect, in some possible implementations, the photovoltaic system includes at least one inverter device. Each inverter device includes at least one inverter. Each inverter device is configured to communicate, through power line communication PLC, with at least one junction device coupled to the inverter device.

DESCRIPTION OF EMBODIMENTS

The following describes technical solutions of this application with reference to the accompanying drawings.

A skin effect (skin effect) may also be referred to as a current crowding effect, and is a phenomenon in which current distribution inside a conductor is uneven, and a current is concentrated on a "skin" part of the conductor, that is, the current is concentrated on a thin layer on an outer surface of the conductor. A shorter distance to the surface of the conductor indicates greater current density, and a current at a position inside the conductor close to a center of the conductor is actually very small. The skin effect increases resistance of the conductor and a power loss during current transmission.

Due to the skin effect, a withstand current in the conductor is not linearly related to a cross-sectional area of the conductor. As the cross-sectional area of the conductor increases, the withstand current per unit cross-sectional area of the conductor decreases.

In addition, for an alternating current and a direct current with equal voltages, a same conducting wire can transmit a larger direct current, that is, can transmit larger power.

In a photovoltaic power station, energy may be converted by using a centralized architecture, a distributed architecture, or a string architecture. In the distributed architecture and the string architecture, maximum power point tracking (maximum power point tracking, MPPT) can be performed, and efficiency is relatively high.

An MPPT technology is commonly used in wind turbines and photovoltaic solar power systems to obtain a maximum power output.

A photovoltaic solar power system is used as an example. Power transmission efficiency of a solar cell is related to an amount of sunlight irradiated on a photovoltaic panel, and is also related to electronic characteristics of a load. When a sunshine status changes, a load curve of maximum power transmission efficiency changes accordingly. If the load can be adjusted in accordance with the load curve with highest power transmission efficiency, a system has best efficiency. A load characteristic with the highest power transmission efficiency is referred to as a maximum power point (maximum power point). The maximum power point tracking is to find the maximum power point and maintain the load characteristic at this power point.

A direct current (direct current, DC)-DC conversion circuit may implement MPPT.

Figure 1:
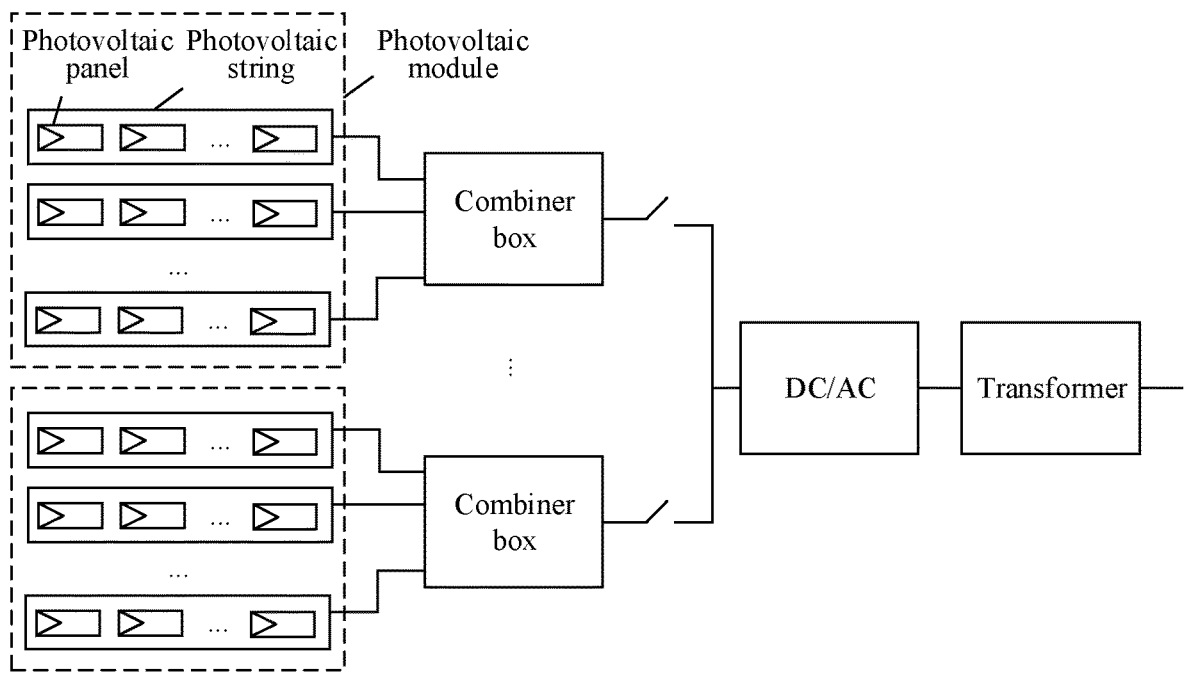
FIG. 1 is a schematic structural diagram of a centralized architecture.

FIG. 1 is a schematic structural diagram of a centralized architecture. In the centralized architecture, a DC-AC single-stage conversion circuit is usually used to convert a direct current.

A photovoltaic module may also be referred to as a photovoltaic array, and includes a plurality of photovoltaic strings. Each photovoltaic string includes a plurality of photovoltaic panels coupled in series. The photovoltaic panel is configured to convert light energy into electric energy. The electric energy generated by the photovoltaic panel is a direct current (direct current, DC). A voltage at both ends of the photovoltaic string is equal to a sum of voltages generated by the plurality of photovoltaic panels.

A combiner box is configured to converge (usually eight, 12, 16, or the like paths of) electric energy generated by the plurality of photovoltaic strings, and after a converged output is subject to a circuit breaker and lightning protection treatment, input the converged output into an inverter for centralized inversion and grid connection. It should be understood that the combiner box of the centralized architecture does not convert input electric energy. The inverter is configured to convert an input direct current into an alternating current (alternating current, AC), that is, perform DC-AC conversion.

A transformer may be configured to convert the alternating current, adjust a voltage value of the alternating current, and output the alternating current. It should be understood that the transformer may boost voltages of alternating currents output by a plurality of inverters. An output of the transformer may be coupled to a power grid. Usually, the transformer converts a voltage of only one alternating current input. When the transformer is provided with a double-split winding, the transformer can convert voltages of two alternating current inputs.

With the centralized architecture, MPPT cannot be performed, resulting in a relatively large mismatch loss and relatively low power generation efficiency. In addition, due to single-level inversion, a working voltage of the photovoltaic string is limited by the alternating current output voltage, and falls within a relatively small range, and the photovoltaic string cannot work at a relatively low voltage. In addition, when a quantity of photovoltaic strings coupled to the combiner box increases or power of the photovoltaic module increases, output power after convergence increases. Due to a limitation of a through-current capability of a power cable, a cross-sectional area of an output cable needs to be very large. As a result, cable costs increase, causing relatively uneconomical performance.

In a centralized inversion manner, each inverter corresponds to a relatively large quantity of photovoltaic strings. If the inverter is faulty, a power generation capacity is seriously affected.

Figure 2:
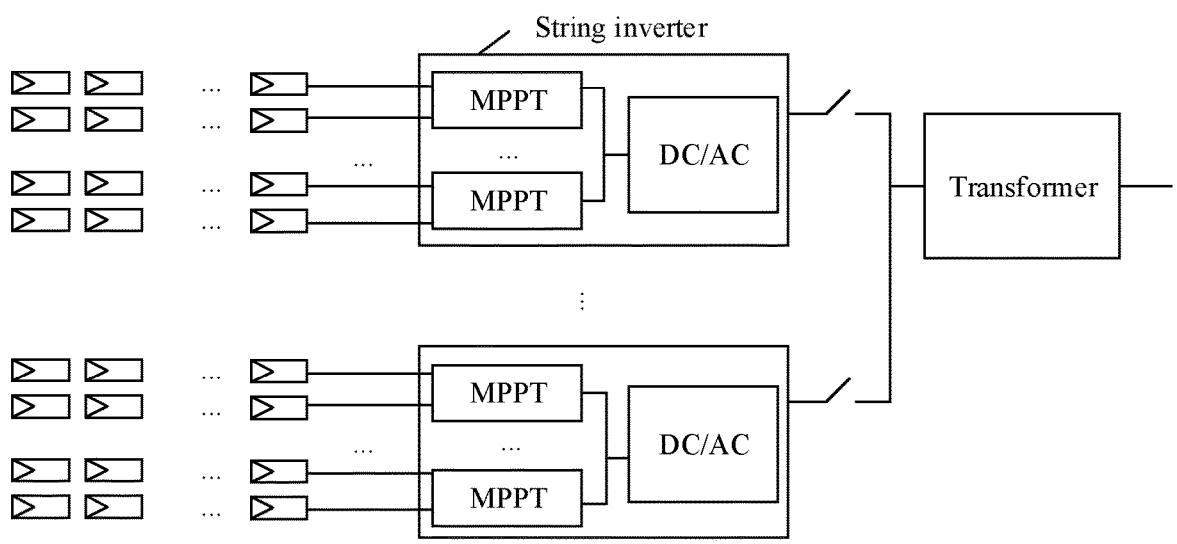
FIG. 2 is a schematic structural diagram of a string architecture.

FIG. 2 is a schematic structural diagram of a string architecture. The string architecture is a mainstream power architecture solution in photovoltaic stations.

A boost (boost)-type DC-DC conversion circuit and a DC-AC conversion circuit are integrated in a device, and the device may be referred to as a string inverter. Compared with a centralized architecture, the string architecture uses a plurality of small string inverters.

A current of the DC-DC conversion circuit is adjustable. The DC-DC conversion circuit, as a load of a photovoltaic module, can be used to implement MPPT. Because the DC-DC conversion circuit may have an MPPT function, the DC-DC conversion circuit may also be referred to as an MPPT circuit. Each MPPT in FIG. 2 is used to represent one DC-DC conversion circuit. Each DC-DC conversion circuit can perform MPPT on one or more photovoltaic strings. Each photovoltaic string includes a plurality of photovoltaic panels coupled in series. Each DC-DC conversion circuit has an independent output. Usually, MPPT can be performed on two photovoltaic strings as a granularity. That is, two photovoltaic strings may be included for the same MPPT, with a relatively fine granularity.

The string inverter may be mounted near a photovoltaic module, to convert a photovoltaic (photovoltaic, PV) direct current into an alternating current nearby. That is, string inverters are arranged in a distributed manner.

Outputs of the plurality of string inverters are converged and then input to a transformer. The transformer boosts a voltage of a converged alternating current. The outputs of the plurality of string inverters are converged by an alternating current distribution box and then output to a direct current terminal of a box-type transformer. In the string architecture, a direct current is inverted in a dispersed manner by using a plurality of string inverters, without a need to use an inverter room. A BTT is a box-type transformer.

As a quantity of photovoltaic strings coupled to the string inverter increases, power of the string inverter further increases, and both a weight and a size of the string inverter increase. The string inverter is usually mounted under a photovoltaic panel support. The size of the string inverter is limited by space under the support, and the weight of the string inverter is limited by a load capacity of the support.

When the power of the string inverter reaches about 200 kilowatts (kilowatt, kW), an output alternating current cable of the string inverter is limited by a through-current capability. The output cable requires a relatively large cross-sectional area, and system cost-effectiveness deteriorates.

A photovoltaic string corresponding to each inverter is fixed. Therefore, if the inverter is faulty, a power generation capacity is relatively greatly affected.

Figure 3:
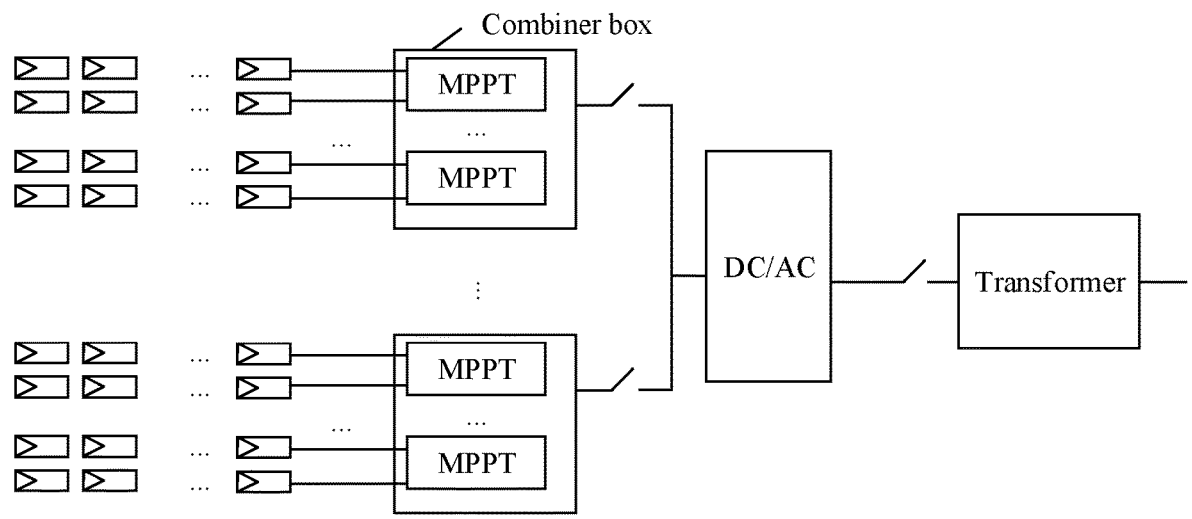
FIG. 3 is a schematic structural diagram of a distributed architecture.

FIG. 3 is a schematic structural diagram of a distributed architecture. A grid connection scheme of centralized inversion and distributed tracking is used for the distributed architecture.

Each photovoltaic string includes a plurality of photovoltaic panels coupled in series. Each DC-DC conversion circuit can implement an MPPT function, and perform power conversion on one or more photovoltaic strings. Each MPPT in FIG. 3 is used to represent one DC-DC conversion circuit.

A plurality of DC-DC conversion circuits is located in one device, that is, one combiner box. It may be understood that, in a centralized architecture, each combiner box includes a plurality of DC/DC conversion circuits, and each DC/DC conversion circuit is configured to convert one or more direct current inputs. Each direct current input may be a direct current generated by one photovoltaic string. Through software control, each DC/DC conversion circuit can further implement the MPPT function. Each DC/DC conversion circuit may be referred to as one MPPT. Each group of PV strings (usually two to four strings) corresponds to one time of MPPT, thereby implementing a distributed tracking function, and greatly reducing an efficiency loss caused by module parameter inconsistency, a partial shadow, and an elevation angle difference.

Each DC-DC conversion circuit is configured to convert a voltage of one group of photovoltaic strings. That is, after the combiner box converges direct currents of a plurality of photovoltaic strings in each group of photovoltaic strings, the DC-DC conversion circuit boosts a voltage of a direct current obtained through aggregation. For example, in a 1500 (Volt, V) system, the voltage may be boosted to 1200 V.

After DC-DC, the combiner box converges outputs of the plurality of DC-DC conversion circuits, and outputs output power of the combiner box through one interface. In other words, the combiner box aggregates the outputs of the plurality of DC-DC conversion circuits, and outputs the outputs through a single bus.

The direct currents output by one or more combiner boxes are transmitted to one inverter, and the inverter is configured to perform DC-AC conversion.

An alternating current output by the inverter is transmitted to a transformer. The transformer is configured to adjust a voltage of the input alternating current.

A direct current power distribution cabinet can be disposed between a plurality of combiner boxes and an inverter. The direct current power distribution cabinet is configured to converge outputs of the plurality of combiner boxes to connect to a high-power inverter.

Compared with the centralized architecture, the distributed architecture reduces a direct current cable transmission loss by boosting a voltage of a PV direct current by using the DC-DC conversion circuit in the combiner box.

In the distributed architecture, when a combiner box is coupled to a relatively large quantity of photovoltaic strings and output power of the combiner box reaches 200 kW, an output cable of the combiner box and an output cable of an inverter each require a relatively large cross-sectional area, resulting in relatively high costs.

In addition, because each inverter corresponds to a relatively large quantity of photovoltaic strings, and an inverter granularity is large, when the inverter is faulty, a power generation capacity of a photovoltaic power station is relatively greatly affected.

It should be understood that DC-AC conversion circuits shown in FIG. 1 to FIG. 3 may perform single-phase inversion, or may perform multi-phase inversion, for example, may perform three-phase inversion. The transformer can be a box-type transformer, that is, a box-type transformer. The box-type transformer may be an oil-immersed transformer, a dry transformer, or the like.

Figure 4:
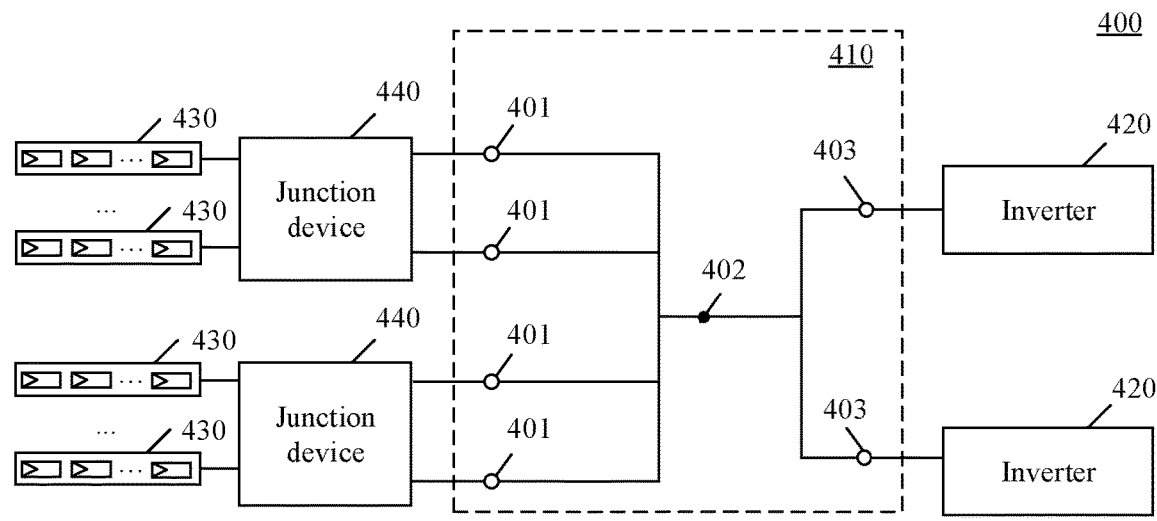
FIG. 4 is a schematic structural diagram of a photovoltaic system according to an embodiment of this application.

FIG. 4 is a schematic structural diagram of a photovoltaic system according to an embodiment of this application.

In a centralized architecture and a distributed architecture, an inverter performs centralized inversion on direct current electric energy output by a junction device, to convert a direct current into an alternating current. If a fault occurs in the inverter, the direct current electric energy transmitted to the inverter cannot be converted, affecting conversion efficiency. That is, the fault of the inverter seriously affects a power generation capacity.

To reduce impact of a fault of an inverter on electric energy transmission efficiency, an embodiment of this application provides a photovoltaic system.

The photovoltaic system 400 includes a transmission apparatus 410, a plurality of inverters 420, a plurality of photovoltaic strings 430, and at least one junction device 440.

Each photovoltaic string 430 includes a first direct current output terminal, and is configured to generate a first direct current.

Each junction device 440 is coupled to the first direct current output terminals of the plurality of photovoltaic strings.

Each junction device 440 includes at least one second direct current output terminal.

Each junction device 440 is configured to converge a plurality of first direct currents into at least one second direct current. A quantity of the at least one second direct current is less than a quantity of the plurality of first direct currents.

The transmission apparatus 410 includes a transmission node 402 and a plurality of third direct current output terminals 403. The transmission apparatus 410 is coupled to the at least one junction device 440, and is configured to transmit, to the transmission node 402, the at least one second direct current output by the at least one junction device. The transmission node 402 is coupled to the plurality of third direct current output terminals 403. Each third direct current output terminal 403 is coupled to one of the plurality of inverters 420.

To be specific, the transmission apparatus 410 is configured to transmit at least one second direct current to the transmission node 402 to form a third direct current, and transmit the third direct current to the plurality of inverters 420.

The plurality of inverters 420 are configured to convert a direct current of the transmission node 402 into an alternating current.

In other words, the photovoltaic system 400 may include one or more junction devices 440. Direct currents output by the one or more junction devices 440 are transmitted to the transmission node 402. The direct current at the transmission node 402 is inverted by the plurality of inverters 420.

Specifically, the transmission apparatus 410 may include at least one input terminal 401, the transmission node 402, and the plurality of third direct current output terminals 403.

The input terminals 401 may be in a one-to-one correspondence with the second direct current output terminals of the junction devices 440. Each input terminal 401 is configured to receive one second direct current. Each third direct current output terminal 403 is configured to output one third alternating current.

The plurality of third direct current output terminals 403 are in a one-to-one correspondence with a plurality of inverter circuits 521. Each third direct current output terminal 403 is configured to transmit the direct current of the transmission node 402 to a direct current terminal of an inverter circuit 521 corresponding to the third direct current output terminal 403. To be specific, values of direct current voltages input to the plurality of inverter circuits 521 are all equal to a value of a voltage of the transmission node. It should be understood that equality also includes approximate equality. In the photovoltaic system 400, a main function of the inverter circuit 521 is to invert a direct current.

During inversion, a direct current is input to a direct current terminal of the inverter circuit, and the inverter circuit inverts the input direct current, and outputs an alternating current at an alternating current terminal of the inverter circuit. Therefore, the direct current terminal of the inverter circuit may also be referred to as an input terminal of the inverter circuit, and the alternating current terminal of the inverter circuit may also be referred to as an output terminal of the inverter circuit.

The transmission node 402 may be a node on a direct current bus. In other words, a direct current of the direct current bus may be transmitted to a plurality of third direct current output terminals 403. A bus is a shared path on which a plurality of devices is coupled in a form of parallel branches. The direct current bus is configured to transmit a direct current. A direct current bus may be formed in a form of wire rows.

The direct current of the transmission node 402 is obtained based on a direct current input of the at least one input terminal 401.

When there is a plurality of input terminals 401, direct currents input at the input terminals 401 may be converged by using a combiner circuit. To be specific, when a quantity of the at least one input terminal 402 is greater than or equal to 2, the transmission apparatus 410 further includes a combiner circuit, and the combiner circuit is configured to converge direct current inputs of all the input terminals 401 into a direct current of the transmission node 402.

The direct current bus on which the transmission node 402 is located may be used as the combiner circuit. The plurality of input terminals 401 may be coupled to the transmission node 402 on the direct current bus, to converge direct currents input at the plurality of input terminals 401. In other words, the direct current bus on which the transmission node is located may be configured to converge the direct currents input at the plurality of input terminals 401.

Alternatively, the direct currents input at the plurality of input terminals 401 may be transmitted to the transmission node 402 after being converged by using the combiner circuit. The combiner circuit may be another direct current bus, or may be a circuit that can implement a convergence function, such as a DC-DC conversion circuit.

Alternating currents output by the plurality of inverter circuits 420 may be transmitted to a power grid through a same transformer or different transformers. The transformer may adjust a voltage in a coupling manner.

When voltages of the alternating currents output by the plurality of inverter circuits 420 are adjusted by using different transformers, because outputs of different transformers may be coupled to a same power grid or different power grids, alternating currents output by a plurality of inverter components 520 may be transmitted to a same power grid or different power grids.

Direct current terminals of a plurality of inverter circuits are coupled to a same transmission node, so that when some of the plurality of inverter circuits are faulty, the other inverter circuits can convert electric energy, thereby reducing impact of an inverter circuit fault on electric energy transmission efficiency. Electric energy transmitted by the transmission apparatus 410 may be generated by a photovoltaic module. In other words, the transmission apparatus 410 may be used in a photovoltaic power generation system.

According to the transmission apparatus provided in this embodiment of this application, the direct current terminals of the plurality of inverter circuits are coupled to the same transmission node, so that a one-to-one correspondence between the inverter circuits and photovoltaic strings in the photovoltaic module is changed. Electric energy generated by the photovoltaic string is transmitted to the transmission node 402, and then is transmitted to input terminals of the plurality of inverter circuits 521. The inverter circuit 521 inverts the direct current of the transmission node 402, and converts the direct current into an alternating current, to avoid a case in which electric energy generated by a photovoltaic string corresponding to an inverter circuit cannot be inverted and cannot be transmitted to an alternating current power grid when the inverter circuit is faulty, thereby improving power generation efficiency.

The transmission node 402 may be coupled to an energy storage apparatus. The photovoltaic system 400 may include the energy storage apparatus.

The energy storage apparatus may store electric energy input to the transmission apparatus 410. Therefore, in the photovoltaic power generation system, the energy storage apparatus may store electric energy generated by the photovoltaic module.

The inverter circuit 521 may be further configured to rectify an alternating current to a direct current. The energy storage apparatus is configured to store the direct current obtained through rectification.

When an amount of the electric energy generated by the photovoltaic module is relatively small and cannot meet a charging power requirement of the energy storage apparatus, all or some of the plurality of inverter circuits 521 may be configured to rectify an alternating current to a direct current.

The alternating current terminal of the inverter circuit may be coupled to the transformer. When operating forwardly, the inverter circuit inverts the direct current transmitted by the transmission node 402 to the inverter circuit, to convert the direct current into an alternating current. The alternating current obtained through conversion by the inverter circuit is transmitted to the power grid through the transformer.

The transformer may boost a voltage of the alternating current generated by the inverter circuit. In this case, the transformer operates forwardly. A side of the transformer coupled to the inverter circuit may be referred to as a low-voltage side, and a side of the transformer coupled to the power grid may be referred to as a high-voltage side.

The transformer may operate reversely and obtain power from the power grid. The inverter circuit may transmit, to an inverter component circuit, the alternating current output by the transformer.

The inverter circuit may also operate reversely. The inverter circuit may convert an alternating current output from the low-voltage side of the transformer into a direct current, and transmit the direct current to the transmission node 402, to charge the energy storage apparatus.

It should be understood that each inverter circuit 521 may be located in one inverter device, or an inverter device may include a plurality of inverter circuits 521.

When the plurality of inverter circuits 521 that receive the direct current transmitted by the transmission node 402 are located in one inverter device, the transmission apparatus 410 may also be located in the inverter device.

When the plurality of inverter circuits 521 that receive the direct current transmitted by the transmission node 402 are located in a plurality of inverter devices, the transmission apparatus 410 may be implemented by using a direct current power distribution cabinet.

Figure 5:
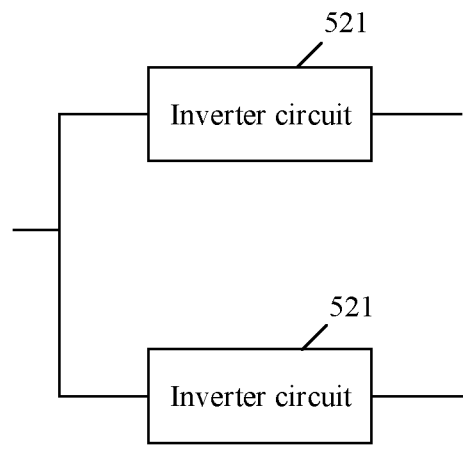
FIG. 5 is a schematic structural diagram of an inverter component according to an embodiment of this application.

The inverter device may include a plurality of inverter components shown in FIG. 5. Each inverter component 420 may include at least one inverter circuit, and an input terminal of each inverter circuit is coupled to an input terminal of the inverter component 420. For details about the inverter component 420, refer to descriptions in FIG. 5. The transmission apparatus 410 may be located in the inverter component 420. In other words, the transmission apparatus 410 may be located in the inverter device.

Alternatively, the transmission apparatus 410 may include some components in the direct current power distribution cabinet and some components in the inverter device. The transmission apparatus 410 may also include a direct current bus in the direct current power distribution cabinet and a direct current bus that is in the inverter component 420 and that is coupled to a plurality of inverter circuits.

The direct current transmitted to the at least one input terminal 401 of the transmission apparatus 410 may include direct current outputs of the one or more junction devices. In other words, the direct current received by the at least one input terminal 401 of the transmission apparatus 410 may include the direct currents output by the one or more junction devices.

Each input terminal 401 of the transmission apparatus 410 is configured to receive one direct current output of the junction device.

The junction device may have only one output port. The junction device includes a combiner circuit, and the combiner circuit is configured to converge a plurality of direct current inputs of the junction device into a direct current output of the output port.

The junction device may alternatively have a plurality of output ports. For details, refer to a description of a junction device 610 in FIG. 6.

Each junction device includes a communications interface, the communications interface is configured to communicate with at least one inverter device, and each inverter device includes at least one inverter circuit.

The inverter device includes a communications interface.

The communications interface of the junction device and the communications interface of the inverter device may communicate in a wired or wireless manner. For example, communication between the junction device and the inverter device may be implemented through power line communication (power line communication, PLC).

The PLC is a unique communication mode of a power system. Power line carrier communication is a technology that uses an existing power line to transmit an analog signal or a digital signal at a high speed through a carrier.

In the power line carrier communication, a network does not need to be re-established, and data can be transmitted provided that there is a wire. The transformer has a function of blocking a power carrier signal.

It should be understood that each inverter device may include one or more inverters. As shown in FIG. 5, the inverter device may include one or more inverter components 520. If the inverter device may include a plurality of inverters, the inverter device may also include a plurality of direct current input terminals, where all or some direct current input terminals are in a one-to-one correspondence with the inverters.

FIG. 5 is a schematic structural diagram of an inverter component according to an embodiment of this application.

An inverter device may include one or more inverter components 520. The inverter component 520 may include at least one inverter circuit 521, and an input terminal of each inverter circuit is coupled to an input terminal of the inverter component 520. In other words, a direct current at the input terminal of the inverter component 520 is transmitted to an input terminal of the at least one inverter circuit 521, and each inverter circuit 521 converts the direct current into an alternating current. Each inverter circuit includes an independent inverter.

The inverter circuit 521 includes an inverter, and the inverter is configured to invert the direct current, to generate an alternating current. Inverters are independent of each other. To be specific, each inverter is controlled by a different control signal.

Each inverter circuit 521 may include a fault isolation unit. The fault isolation unit includes at least one of a switch unit, a diode, or a fuse. The fault isolation unit is located at an input terminal and/or an output terminal of the inverter circuit.

The fault isolation unit of each inverter circuit 521 may be configured to protect the inverter circuit 521. When another circuit in the photovoltaic system is faulty, the inverter circuit 521 is decoupled from another component, to protect the inverter circuit 521.

Each inverter circuit 521 may include a filter inductor, and the filter inductor is configured to filter the alternating current generated by the inverter in the inverter circuit.

Because each inverter circuit 521 may operate independently, each inverter circuit 521 includes a filter inductor, and an inductance value of the filter inductor may be set based on operating power of the inverter circuit 521. Because some inverter circuits 521 are faulty, compared with disposing a uniform filter inductor for the inverter component or an inverter component device, disposing a filter inductor in each inverter circuit 521 to filter the alternating current generated by the inverter in each inverter circuit and designing, for each inverter circuit 521, an inductance value based on the inverter circuit 521 can implement a relatively good filtering effect.

Each inverter circuit 521 may include a grid-connected switch, and the grid-connected switch includes at least one relay. Relays are independent of each other. To be specific, the grid-connected switch of each inverter circuit 521 is controlled by a different control signal, or control signals of the relays are independent of each other.

A connection between an output of each inverter circuit and the power grid is controlled through the relay. It should be understood that each grid-connected switch of the at least one inverter circuit has an independent control signal, that is, the at least one inverter circuit each has an independent grid-connected switch. In other words, each grid-connected switch may be independently controlled, that is, may separately control whether the at least one inverter circuit is coupled to the power grid.

Usually, the relay uses one loop (usually a low current) to control connection and disconnection of another loop (usually a high current). The grid-connected switch is usually located at the output terminal of the inverter circuit. The control signal of the relay in the grid-connected switch may control whether the inverter circuit is coupled to a subsequent circuit. In a photovoltaic power generation system, the subsequent circuit usually includes a transformer.

Grid-connected switches of the inverter circuit 521 are independent of each other, and each grid-connected switch may be independently turned on or off, thereby improving circuit control flexibility.

Each inverter circuit 521 may include a residual current device (residual current device, RCD) circuit. A residual current (residual current) may also be referred to as a residual current or a leakage current, and is a current that has a vector sum of currents of all phases (including a neutral line) in a low-voltage power distribution line is not zero. Generally, when an accident occurs on a power-consuming side, a current flow from a charged body to a ground through a human body, causing a current of phase 1 in an incoming and outgoing line of a main circuit to be not equal to a current of another phase. In this case, an instantaneous vector synthesis effective value of the current is referred to as a residual current.

When the residual current changes, it indicates that insulation of a charged conductor to the ground is damaged. In this case, the residual current is detected to start a protection device trip, to prevent an occurrence of an electric shock and a fire caused by a ground arc. The RCD circuit is configured to detect the residual current, and when the residual current of the circuit reaches a specified value for the circuit under a specified condition, cause a contact to operate to disconnect the main circuit.

Each inverter circuit 521 includes an RCD circuit, and this can prevent an accident caused by an electric leakage. Because the RCD circuit is located in each inverter circuit 521, when an electric leakage occurs, only an inverter circuit 521 on which the electric leakage occurs is disconnected, so that impact on electric energy conversion efficiency can be reduced.

Figure 6:
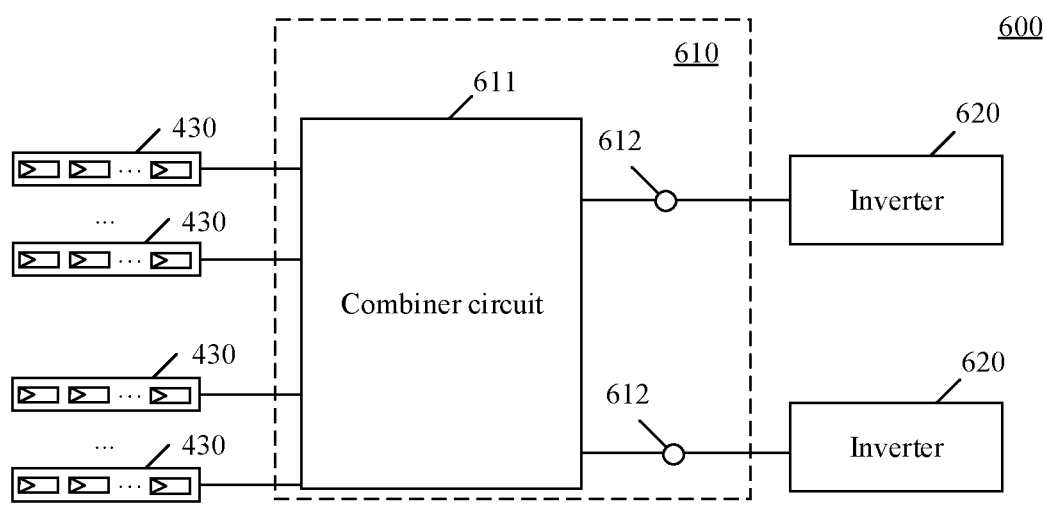
FIG. 6 is a schematic structural diagram of another photovoltaic system according to an embodiment of this application.

FIG. 6 is a schematic structural diagram of a photovoltaic system according to an embodiment of this application.

When power of direct current energy generated by a photovoltaic string is relatively low, a loss in a transmission process is relatively large, and transmission costs are relatively high. In a centralized architecture and a distributed architecture, each combiner box converges a plurality of direct current inputs to obtain one direct current output. Electric energy of each direct current input of the combiner box is generated by one photovoltaic string. The direct current output is transmitted to an inverter through a direct current cable. The direct current electric energy generated by the photovoltaic string is converged, to reduce a transmission loss and transmission costs.

However, as a scale of a photovoltaic module increases, total electric energy of a plurality of direct current inputs corresponding to each combiner box increases, and a current of a direct current output of the combiner box increases.

Due to a skin effect, as a cross-sectional area of a conductor in a cable increase, a withstand current per cross-sectional area of the conductor decreases, and transmission costs increase.

To reduce the transmission costs, an embodiment of this application provides a photovoltaic system 600.

The photovoltaic system 600 includes a plurality of photovoltaic strings 430, at least one junction device 610, and at least one inverter 620.

Each photovoltaic string 430 includes a first direct current output terminal, and is configured to generate a first direct current.

Each junction device 610 is coupled to first direct current output terminals of at least two of the plurality of photovoltaic strings 430. Each junction device 610 is configured to output a second direct current through a second direct current output terminal 612 of the junction device 610 after converging the plurality of first direct currents.

An $i^{th}$ junction device in the at least one junction device includes a plurality of second direct current output terminals 612. The $i^{th}$ junction device is configured to output a plurality of mutually independent second direct currents after converging the plurality of first direct currents.

It should be understood that each second direct current output terminal 612 corresponds to one second direct current.

For each junction device, a quantity of the plurality of second direct currents is less than a quantity of the plurality of first direct currents, and i is a positive integer.

In the at least one junction device of the photovoltaic system 600, all or some junction devices 610 may include a plurality of second direct current output terminals 612. In other words, some junction devices 610 in the photovoltaic system may include only one second direct current output terminal 612, configured to output one second direct current.

The at least one inverter 620 is configured to connect to a plurality of second direct current output terminals and convert a plurality of received second direct currents into an alternating current.

In other words, the at least one inverter 620 is coupled to the at least one junction device 610. The at least one inverter 620 is configured to convert a direct current output by the at least one junction device 610.

Specifically, the junction device 610 may include a combiner circuit 611 and a plurality of second direct current output terminals 612.

The combiner circuit 611 is configured to converge a plurality of direct current inputs of the junction device 610 into a plurality of direct current outputs of the junction device 610. Each direct current input of the junction device 610 is one first direct current. Each direct current output of the junction device 610 is one second direct current.

The plurality of direct current outputs of the junction device 610 are in a one-to-one correspondence with the plurality of second direct current output terminals 612.

The plurality of direct current outputs of the junction device 610 are transmitted to the at least one inverter 620.

A quantity of the plurality of direct current inputs of the junction device 610 is greater than a quantity of the plurality of direct current outputs.

The combiner circuit 611 may include a plurality of DC-DC conversion circuits, and each DC-DC conversion circuit performs DC-DC conversion on one or more direct current inputs of the junction device.

When the DC-DC conversion circuit has a plurality of direct current inputs, the DC-DC conversion circuit can converge the plurality of direct current inputs.

The DC-DC conversion circuit adjusts a voltage of a direct current. A boost (boost)-type DC-DC conversion circuit can increase a value of the voltage. Because input power of the DC-DC conversion circuit is equal to output power, a current of an output direct current decreases if a voltage of the output direct current increases. This reduces a loss in a transmission process. Therefore, transmission efficiency can be improved as the boost-type DC-DC conversion circuit can increase the voltage.

In addition, use of the DC-DC conversion circuit can implement an MPPT function, thereby improving transmission power of the photovoltaic system 600.

The combiner circuit 611 may connect some of the plurality of direct current inputs of the junction device through wires, to converge some direct current inputs into one direct current output.

The combiner circuit 611 may further connect to a plurality of direct current inputs of the junction device 610 through wires, and then transmit the plurality of direct current inputs of the junction device 610 to a plurality of DC-DC conversion circuits. An output of each DC-DC conversion circuit may be a direct current output of the junction device 610.

The combiner circuit 611 may alternatively be another combiner circuit. This is not specifically limited in this embodiment of this application.

Electric energy of the plurality of direct current inputs of the junction device 610 may be generated by a photovoltaic module.

The inverter 620 may be located in an inverter device. The inverter device may include one or more inverters 620. As shown in FIG. 5, the inverter device may include one or more inverter components 520.

The photovoltaic system may include one inverter 620.

Similar to the inverter in the distributed architecture or the centralized architecture, the inverter 620 in the photovoltaic system 600 may be configured to connect all junction devices 610 in the photovoltaic system 600. The inverter 620 may be configured to convert second direct currents output by all the junction devices 610 in the photovoltaic system 600 into an alternating current.

The photovoltaic system may alternatively include a plurality of inverters 620.

In some embodiments, each inverter 620 is configured to connect to at least one second direct current output terminal of one junction device in the photovoltaic system 600, and convert at least one received second direct current into an alternating current.

For example, the plurality of second direct current output terminals 612 of the junction device 610 may be in a one-to-one correspondence with the plurality of inverters 620. The plurality of second direct currents output by the junction device 610 may be transmitted, through the second direct current output terminals 612 corresponding to the second direct currents, to inverter circuits 521 corresponding to the second direct current output terminals 612. In other words, the plurality of second direct currents of the junction device 610 are in a one-to-one correspondence with the inverter circuits 521. Each inverter circuit 521 is configured to convert a direct current output of the junction device 610 into an alternating current.

For another example, the plurality of junction devices 610 may be in a one-to-one correspondence with the plurality of inverters 620.

For still another example, the plurality of junction devices 610 may be in a one-to-one correspondence with the plurality of inverter components 520, or each second direct current output terminal 612 of the junction device 610 corresponds to one inverter component 520. This is not limited in this embodiment of this application. The inverter device may include one or more inverter components.

An inverter corresponding to one junction device 610 may be located in one inverter device. The plurality of junction devices 610 may be in a one-to-one correspondence with a plurality of inverter devices.

Each junction device 610 may include at least one DC-DC conversion circuit, and each direct current DC-DC conversion circuit is coupled to a first direct current output of at least one photovoltaic string, and is configured to perform DC-DC conversion on the at least one first direct current.

Comparison with the centralized architecture or the distributed architecture shows that the inverter device receives all or some direct current outputs of only one junction device, thereby reducing a granularity of the inverter and reducing impact of an inverter device fault on conversion efficiency of the inverter device.

Comparison with a string inverter shows that an inversion function and a DC-DC conversion function are implemented by two devices, thereby improving environment adaptability of the photovoltaic system and mounting flexibility.

Usually, each inverter device includes one inverter. Inverters are in a one-to-one correspondence with junction devices. If some inverters or some junction devices are faulty, operation of another branch circuit connecting a junction device and an inverter is not affected. One inverter is used to invert all direct currents output by one junction device, so that a quantity of inverters in the photovoltaic system is reduced, thereby reducing costs.

Further, the photovoltaic system 600 may include an alternating current node and at least one energy storage apparatus, and a quantity of the at least one inverter is greater than a quantity of energy storage apparatuses.

The alternating current node is coupled to an alternating current terminal that is of each inverter and that is configured to output an alternating current. A direct current terminal that is of a $j^{th}$ inverter in the at least one inverter and that is configured to receive a direct current is coupled to a $j^{th}$ energy storage apparatus in the at least one energy storage apparatus, where j is a positive integer.

When the $j^{th}$ inverter charges the $j^{th}$ energy storage apparatus, the $j^{th}$ inverter is configured to rectify an alternating current to form a fourth direct current.

The $j^{th}$ energy storage apparatus is configured to store the fourth direct current.

In other words, an alternating current terminal of the at least one inverter circuit 521 may be coupled to the alternating current node. Direct current terminals of some of the plurality of inverter circuits 521 may be coupled to the energy storage apparatus.

Electric power for charging the energy storage apparatus may be from various sources.

A direct current output that is output by a second direct current output terminal 612 coupled to the energy storage apparatus may charge the energy storage apparatus.

Electric energy of a plurality of direct current inputs of the junction device may be generated by the photovoltaic module. In other words, the electric energy that is generated by the photovoltaic module and that is transmitted to the second direct current output terminal 612 coupled to the energy storage apparatus may charge the energy storage apparatus.

Alternating current terminals of the plurality of inverter circuits 521 may be coupled to the alternating current node. In other words, the alternating current outputs of the plurality of inverter circuits 521 may be transmitted to the alternating current node. The inverter circuit 521 coupled to the energy storage apparatus may operate reversely. To be specific, the inverter circuit 521 coupled to the energy storage apparatus may rectify an alternating current of the alternating current node, and a direct current obtained by rectifying the alternating current of the alternating current node by the inverter circuit 521 coupled to the energy storage apparatus may charge the energy storage apparatus.

The alternating current of the alternating current node may include an alternating current obtained through inversion by an inverter circuit 521 other than the inverter circuit 521 coupled to the energy storage apparatus, and may further include an alternating current obtained from a power grid. The alternating current obtained from the power grid is an alternating current output by a transformer coupled to the alternating current node.

There may be a plurality of inverter circuits 521. Output terminals of the plurality of inverter circuits 521 may also be coupled to different power grids. In other words, the output terminals of the plurality of inverter circuits 521 may also be coupled to different alternating current nodes. Alternating currents of different alternating current nodes may be transmitted to different power grids through different transformers.

In some other embodiments, the photovoltaic system 600 may further include a transmission apparatus 410, and the transmission apparatus 410 includes a transmission node and a plurality of third direct current output terminals.

The photovoltaic system 600 includes a plurality of inverters 620.

The transmission apparatus 410 is coupled to the at least one junction device 610. The transmission apparatus 410 is configured to transmit, to the transmission node, the at least one second direct current output by the at least one junction device 610. The transmission node is coupled to the plurality of third direct current output terminals, and each third direct current output terminal is coupled to one inverter in the at least one inverter device.

In other words, the plurality of direct current outputs of the junction device 610 may be transmitted to the plurality of inverters 620 by using the transmission apparatus 410. For the transmission apparatus 410, refer to the description of FIG. 4.

Further, the photovoltaic system 600 may further include an energy storage apparatus, and the transmission node 402 is coupled to the energy storage apparatus.

The junction device 610 may include a communications interface, the communications interface is configured to communicate with at least one inverter device, and each inverter device includes at least one inverter 620. The inverter device includes a communications interface.

The communications interface of the junction device and the communications interface of the inverter device may communicate in a wired or wireless manner. For example, communication between the junction device and the inverter device may be implemented through power line communication (power line communication, PLC). In other words, the inverter device may be configured to communicate, through power line communication PLC, with at least one junction device 610 coupled to the inverter device. The junction device 610 may be configured to communicate, through power line communication PLC, with at least one inverter device coupled to the junction device 610.

Figure 7:
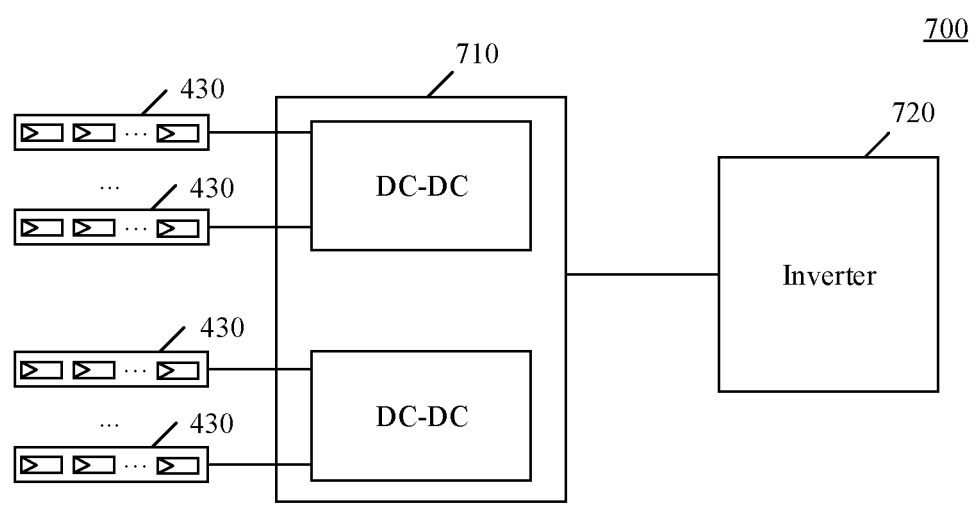
FIG. 7 is a schematic structural diagram of still another photovoltaic system according to an embodiment of this application.

FIG. 7 is a schematic structural diagram of a photovoltaic system according to an embodiment of this application.

In a centralized architecture and a distributed architecture, an inverter jointly inverts received direct currents output by a plurality of combiner boxes. If the inverter is faulty, electric energy conversion efficiency is relatively greatly affected.

In a string architecture, a string inverter is usually mounted under a photovoltaic module support. A mounting condition limits maximum values of a size and quality of the string inverter, and electric power generated by a photovoltaic module corresponding to the string inverter is limited.

To reduce impact of an inverter fault on electric energy conversion efficiency of the centralized architecture and the distributed architecture, and avoid a limitation of the string architecture on the electric power of the string inverter, this embodiment of this application provides a photovoltaic system 700.

The photovoltaic system 700 includes a plurality of photovoltaic strings 430, at least one inverter 720, and at least one junction device 710.

Each photovoltaic string 430 includes a first direct current output terminal, and is configured to generate a first direct current.

Each junction device 710 is coupled to first direct current output terminals of the plurality of photovoltaic strings 430. Each junction device 710 includes at least one direct current DC-DC conversion circuit and at least one second direct current output terminal. Each direct current DC-DC conversion circuit is coupled to a first direct current output terminal of at least one photovoltaic string, and is configured to perform DC-DC conversion on at least one first direct current. Each junction device 710 is configured to output at least one second direct current after converging a plurality of first direct currents. A quantity of the at least one second direct current is less than a quantity of the plurality of first direct currents.

In other words, a direct current terminal of each inverter 710 is configured to receive at least one second direct current of one junction device 710.

Each inverter 720 is configured to connect to at least one second direct current output terminal of one of the at least one junction device 710, and convert the at least one received second direct current into an alternating current.

Specifically, one or more inverters 710 may be located in one inverter device. Each inverter device may include at least one inverter component 711.

An input terminal of each inverter 720 is configured to receive at least one direct current output of one junction device 710.

Each inverter device may be configured to convert the at least one direct current output of the junction device 710 into an alternating current. Each inverter 720 may receive all or some direct current outputs of one junction device 710. Each junction device 710 may include one or more direct current outputs. If the junction device 710 includes one direct current output, the direct current output may be transmitted to one inverter 720. Inverters 720 are in a one-to-one correspondence with junction devices 710. If the junction device 710 includes a plurality of direct current outputs, the plurality of direct current outputs may be transmitted to one or more inverters 720. The one or more inverters 720 configured to receive the plurality of direct current outputs the junction device 710 may be located in one inverter device. The inverter device may not include another inverter, and inverts only the direct current outputs of the junction device 710.

In some embodiments, a plurality of inverter circuits may be in a one-to-one correspondence with at least one direct current output of the junction device 710, and each inverter circuit is configured to convert a direct current output of a corresponding junction device 710 into an alternating current. For details, refer to a description of FIG. 11.

In some other embodiments, a direct current terminal of each inverter circuit is coupled to a direct current terminal of the inverter component.

In some other embodiments, the inverter 720 includes a plurality of inverter components 520. The plurality of inverter components 520 are in a one-to-one correspondence with at least one direct current output of the junction device 710, and each inverter component 520 is configured to convert a direct current output of a corresponding junction device 710 into an alternating current.

For the inverter component 520, refer to the description of FIG. 5.

The junction device 610 includes a communications interface, the communications interface is configured to communicate with at least one inverter device, and each inverter device includes at least one inverter circuit 521.

The inverter device includes a communications interface.

The communications interface of the junction device and the communications interface of the inverter device may communicate in a wired or wireless manner. For example, communication between the junction device and the inverter device may be implemented through power line communication (power line communication, PLC).

In the photovoltaic system 700, an output terminal of the inverter 720 may be coupled to a same alternating current node.

The photovoltaic system 700 may include an alternating current node and at least one energy storage apparatus, and a quantity of the at least one inverter is greater than a quantity of the at least one energy storage apparatus.

The alternating current node is coupled to an alternating current terminal, of each inverter 720, used for outputting an alternating current.

A direct current terminal that is of a $j^{th}$ inverter in the at least one inverter 720 and that is configured to receive a direct current is coupled to a $j^{th}$ energy storage apparatus in the at least one energy storage apparatus, where j is a positive integer.

When the $j^{th}$ inverter 720 charges the $j^{th}$ energy storage apparatus, the $j^{th}$ inverter 720 is configured to rectify an alternating current to form a fourth direct current, where j is a positive integer.

The $j^{th}$ energy storage apparatus is configured to store the fourth direct current.

If a plurality of inverters 720 in one inverter device may be in a one-to-one correspondence with at least one direct current output of the junction device 710, or if a plurality of inverter components 520 in one inverter device are in a one-to-one correspondence with at least one direct current output of the junction device 710, input terminals of some inverter circuits may be coupled to an energy storage apparatus.

When output terminals of the plurality of inverters 720 are coupled to the alternating current node, input terminals of some of the plurality of inverters 720 may be coupled to an energy storage apparatus.

Electric power for charging the energy storage apparatus may be from various sources.

A direct current output of a junction device coupled to the energy storage apparatus may be used to charge the energy storage apparatus.

A plurality of direct current inputs of the junction device may be generated by a photovoltaic module. In other words, a direct current output that is generated by the photovoltaic module and that is transmitted to an output port of the junction device coupled to the energy storage apparatus may charge the energy storage apparatus.

Output terminals of the plurality of inverter circuits may be coupled to the alternating current node. In other words, alternating current outputs of the plurality of inverter circuits may be transmitted to the alternating current node. The inverter circuit coupled to the energy storage apparatus may operate reversely. To be specific, the inverter circuit coupled to the energy storage apparatus may rectify an alternating current of the alternating current node, and a direct current obtained by rectifying the alternating current of the alternating current node by the inverter circuit coupled to the energy storage apparatus may charge the energy storage apparatus.

The alternating current of the alternating current node may include an alternating current obtained through inversion by an inverter circuit other than the inverter circuit coupled to the energy storage apparatus, and may further include an alternating current obtained from a power grid. The alternating current obtained from the power grid is an alternating current output by a transformer coupled to the alternating current node.

A maximum operating power value of each inverter circuit is relatively small. Therefore, a power storage battery is coupled to direct current sides of some alternating current circuits, so that effective utilization for each power storage battery can be improved, a quantity of power storage batteries in a photovoltaic system can be reduced, and costs can be reduced.

It should be understood that alternating current terminals of the plurality of inverters 720 may alternatively be coupled to different power grids. In other words, the plurality of inverters 720 in the photovoltaic system 700 may not be coupled to a same alternating current node. Each grid may correspond to a same alternating current node or a different alternating current node.

It should be understood that the alternating current node may be further coupled to another inverter. For example, one or more inverters in the photovoltaic system 600 or the photovoltaic system 700 may be coupled to the same alternating current node through alternating current terminals of a plurality of inverters in the photovoltaic system 400.

The inverter device receives a direct current output of only one junction device, thereby reducing a granularity of the inverter and reducing impact of an inverter device fault on conversion efficiency of the inverter device.

In the photovoltaic system provided in this embodiment of this application, a convergence function is implemented by using the junction device, and an inversion function is implemented by using the inverter device. A mounting condition limits maximum values of a size and quality of the string inverter, and the junction function and the inversion function are implemented by using different devices. In this embodiment of this application, the inversion function is separated from the string inverter, so that the junction device and the inverter device can be mounted at different positions, and it only needs to make the junction device meet size and weight limitations of the mounting condition. The photovoltaic system provided in this embodiment of this application can better adapt to an environment and can be mounted more flexibly.

Figure 8:
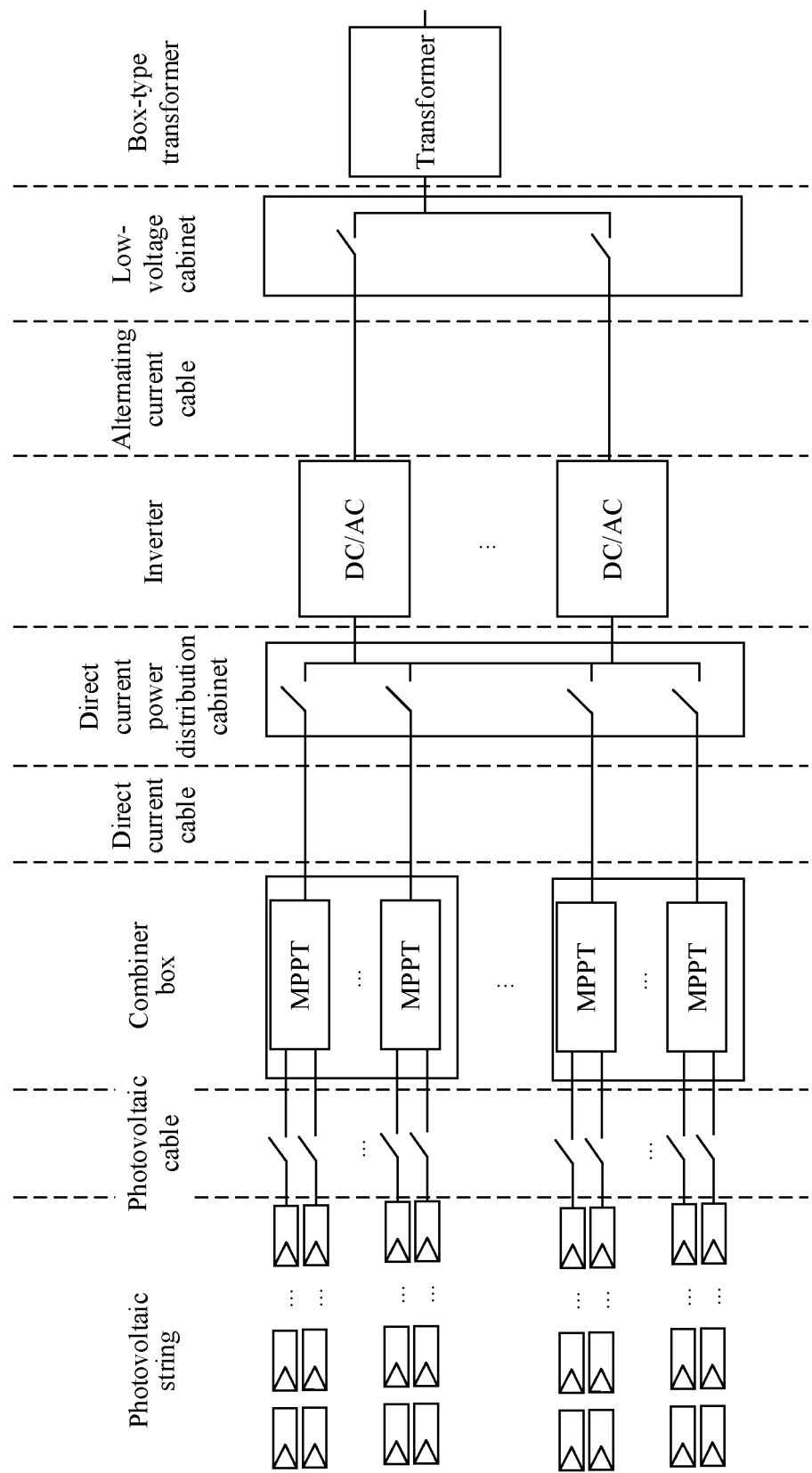
FIG. 8 is a schematic structural diagram of still another photovoltaic system according to an embodiment of this application.

FIG. 8 is a schematic structural diagram of a photovoltaic system according to an embodiment of this application.

A photovoltaic panel converts light energy into direct current electric energy. The photovoltaic system is configured to convert the direct current electric energy generated by the photovoltaic panel.

The photovoltaic system includes a combiner box, a direct current power distribution cabinet, an inverter, a low-voltage cabinet, a transformer, and the like.

Direct currents generated by each group of photovoltaic strings are input to one DC-DC conversion circuit. Each group of photovoltaic strings includes at least one photovoltaic string, for example, may include two to four photovoltaic strings. Photovoltaic panels in one photovoltaic string are coupled in series.

Each combiner box may include one or more DC-DC conversion circuits. Each DC-DC conversion circuit may convert at least one direct current to obtain one direct current.

In the photovoltaic system shown in FIG. 8, the combiner box may use a plurality of direct currents generated by a plurality of DC-DC conversion circuits as a plurality of direct current outputs of the combiner box.

Figure 9:
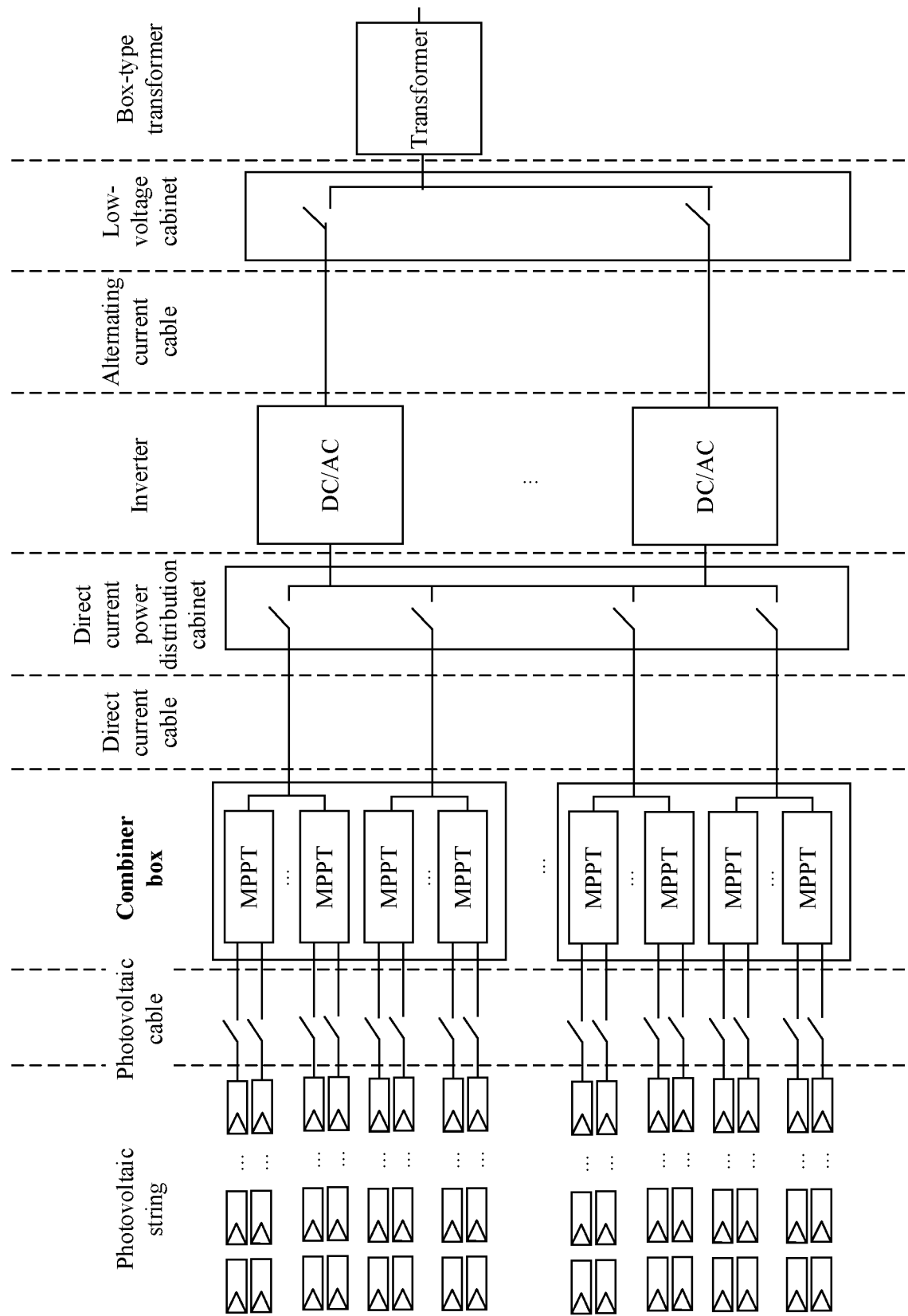
FIG. 9 is a schematic structural diagram of still another photovoltaic system according to an embodiment of this application.

In a photovoltaic system shown in FIG. 9, a combiner box may divide a plurality of direct currents generated by a plurality of DC-DC conversion circuits into at least two groups. Direct currents in each group are converged, and a direct current obtained by converging each group is used as one direct current output of the combiner box.

The combiner box may further include a DC-DC two-stage conversion circuit. At least one direct current generated by at least one DC-DC conversion circuit is transmitted to a direct current node, that is, direct currents generated by at least one DC-DC first-stage conversion circuit are converged. A direct current of the direct current node may be transmitted to a plurality of DC-DC second-stage conversion circuits to generate a plurality of direct currents. The direct current of the direct current node is separated by the DC-DC second-stage conversion circuit, and a plurality of independent direct currents are generated. The plurality of direct currents generated by the plurality of DC-DC second-stage conversion circuits are a plurality of direct current outputs of the combiner box.

The DC-DC conversion circuit is configured to change a voltage value of a direct current. The DC-DC conversion circuit may be a boost (boost)-type DC-DC conversion circuit, or may be a buck (buck)-type DC-DC conversion circuit. In a photovoltaic power generation system, a boost (boost)-type DC-DC conversion circuit is usually used, to reduce transmission power consumption by increasing a voltage value.

During transmission of electricity of equal power, a larger voltage value indicates a smaller current value and a smaller transmission loss that is caused by a cable.

The DC-DC conversion circuits operate independently of each other. A fault of one DC-DC conversion circuit does not affect normal operation of another DC-DC conversion circuit.

Direct currents output by the plurality of DC-DC conversion circuits are transmitted to a direct current power distribution cabinet through direct current cables. Each combiner box is coupled to the direct current power distribution cabinet through a plurality of direct current cables. A current in each direct current cable is an output of a different DC-DC conversion circuit. Therefore, direct currents in the plurality of direct current cables are independent of each other. The plurality of direct current cables transmits the direct currents, thereby reducing cable costs.

The direct current power distribution cabinet converges the direct currents output by the plurality of DC-DC conversion circuits. The direct current power distribution cabinet includes a direct current bus. The direct currents output by the plurality of DC-DC conversion circuits are transmitted to the direct current bus.

The direct current power distribution cabinet may further include a line protection device. Switch apparatuses such as a circuit breaker, a diode, and a fuse may be coupled between the plurality of DC-DC conversion circuits and the direct current bus.

The direct current power distribution cabinet transmits a converged direct current to a plurality of DC-AC conversion circuits. The DC-AC conversion circuit may also be referred to as an inverter. Some of the plurality of DC-AC conversion circuits are faulty, and another DC-AC conversion circuit operates normally, so that a total power generation capacity can be increased.

The plurality of DC-AC conversion circuits is coupled to a low-voltage cabinet through alternating current cables and/or conductive metal bars. The low-voltage cabinet includes an alternating current bus. An alternating current output by each DC-AC conversion circuit is transmitted to the alternating current bus, that is, the low-voltage cabinet converges the alternating currents output by the plurality of DC-AC conversion circuits.

The low-voltage cabinet may further include a line protection device. Switch apparatuses such as a circuit breaker, a diode, and a fuse may be coupled between the plurality of DC-AC conversion circuits and the alternating current bus.

The alternating current bus is coupled to an input terminal of a transformer. An alternating current obtained by the low-voltage cabinet through convergence is transmitted to a low-voltage winding of the transformer. The transformer boosts a voltage of the alternating current.

A quantity of DC-AC conversion circuits may be equal to a quantity of DC-DC conversion circuits, or may be equal to a quantity of combiner boxes, or may be another value determined based on circuit power. This is not limited in this embodiment of this application.

Figure 10:
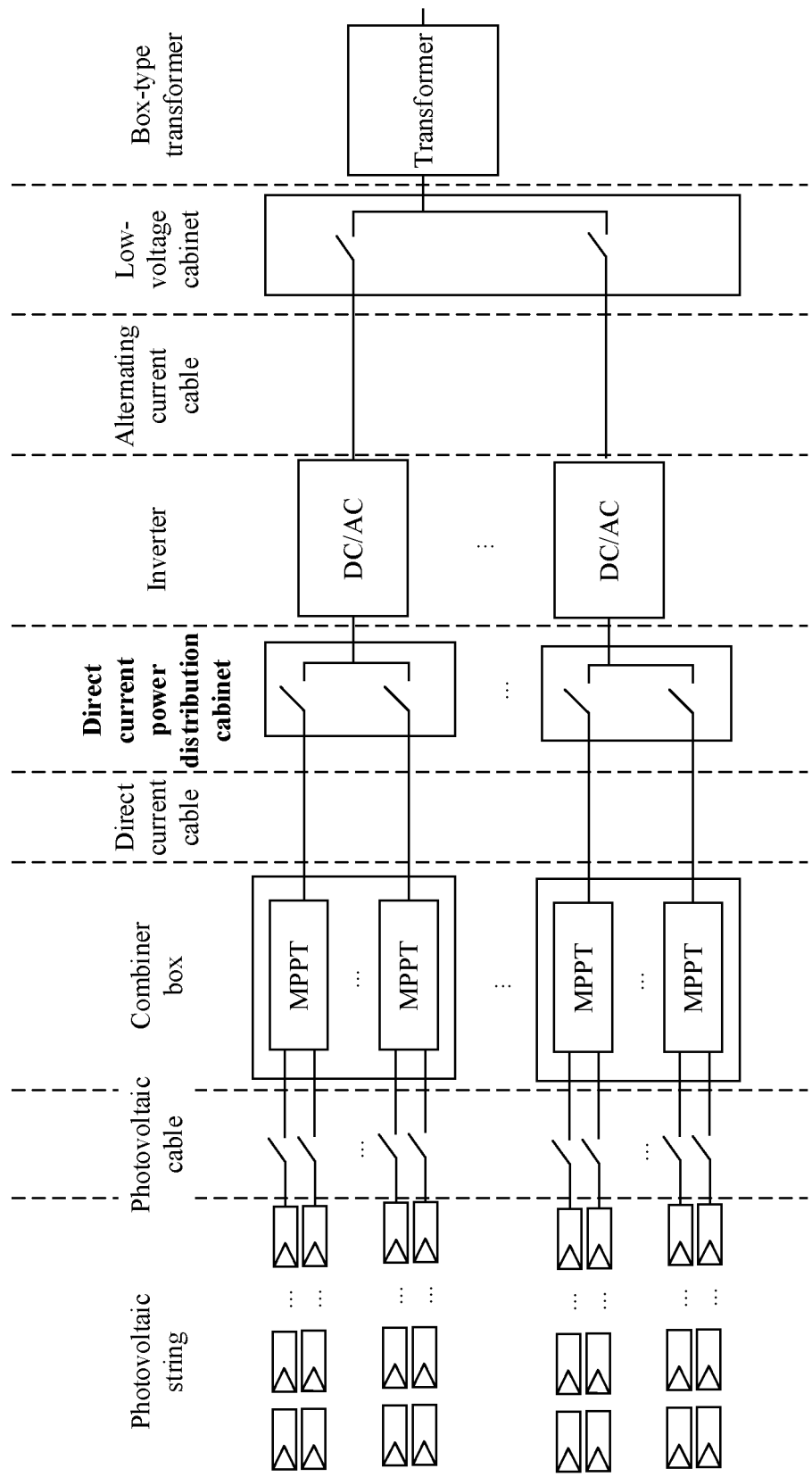
FIG. 10 is a schematic structural diagram of still another photovoltaic system according to an embodiment of this application.

FIG. 10 is a schematic structural diagram of a photovoltaic system according to an embodiment of this application.

The photovoltaic system includes a photovoltaic panel, and the photovoltaic panel is configured to convert light energy into direct current electric energy. Another device in the photovoltaic system is configured to convert the direct current electric energy generated by the photovoltaic panel.

The photovoltaic system further includes a combiner box, a direct current power distribution cabinet, an inverter, a low-voltage cabinet, a transformer, and the like.

Each combiner box may include one or more DC-DC conversion circuits. The DC-DC conversion circuit is configured to change a voltage value of a direct current. A plurality of DC-DC conversion circuits operates independently. A fault of one DC-DC conversion circuit does not affect normal operation of another DC-DC conversion circuit.

Direct currents output by the plurality of DC-DC conversion circuits are transmitted to a plurality of direct current power distribution cabinets through direct current cables. A quantity of the direct current power distribution cabinets may be greater than, less than, or equal to a quantity of combiner boxes. In some embodiments, combiner boxes may be in a one-to-one correspondence with direct current power distribution cabinets. In other words, a DC-DC conversion circuit in one combiner box is coupled to one direct current power distribution cabinet.

Each direct current power distribution cabinet includes one direct current bus. Direct currents output by DC-DC conversion circuits coupled to a same direct current power distribution cabinet are converged through the direct current bus.

Each combiner box may be coupled to a direct current power distribution cabinet through a plurality of direct current cables. A current in each direct current cable is an output of a different DC-DC conversion circuit. Therefore, direct currents in the plurality of direct current cables are independent of each other. The plurality of direct current cables transmits the direct currents, thereby reducing cable costs.

The direct current power distribution cabinet converges the direct currents output by the plurality of DC-DC conversion circuits. The direct current power distribution cabinet includes a direct current bus. The direct currents output by the plurality of DC-DC conversion circuits are transmitted to the direct current bus.

The direct current power distribution cabinet may further include a line protection device. Switch apparatuses such as a circuit breaker, a diode, and a fuse may be coupled between the plurality of DC-DC conversion circuits and the direct current bus.

Each direct current power distribution cabinet may correspond to one DC-AC conversion circuit. A direct current converged by each direct current power distribution cabinet is transmitted to one DC-AC conversion circuit.

Each direct current power distribution cabinet may alternatively transmit a converged direct current to a plurality of DC-AC conversion circuits. In other words, input terminals of the plurality of DC-AC conversion circuits are coupled to the direct current bus in the direct current power distribution cabinet. Voltages of direct currents input to all the DC-AC conversion circuits are equal.

It should be understood that a function of the direct current power distribution cabinet may alternatively be implemented by a direct current bus in an inverter device. In other words, the inverter device may include a direct current bus and a DC-AC conversion circuit. The direct current bus is configured to converge a plurality of direct currents, and input a converged direct current into the DC-AC conversion circuit for inversion.

The plurality of DC-AC conversion circuits is coupled to the low-voltage cabinet through alternating current cables. The low-voltage cabinet includes an alternating current bus. An alternating current output by each DC-AC conversion circuit is transmitted to the alternating current bus, that is, the low-voltage cabinet converges the alternating currents output by the plurality of DC-AC conversion circuits.

The low-voltage cabinet converges the alternating currents output by the plurality of DC-AC conversion circuits. An alternating current converged by the low-voltage cabinet through convergence is transmitted to the transformer. The transformer boosts a voltage of the converged alternating current.

Figure 11:
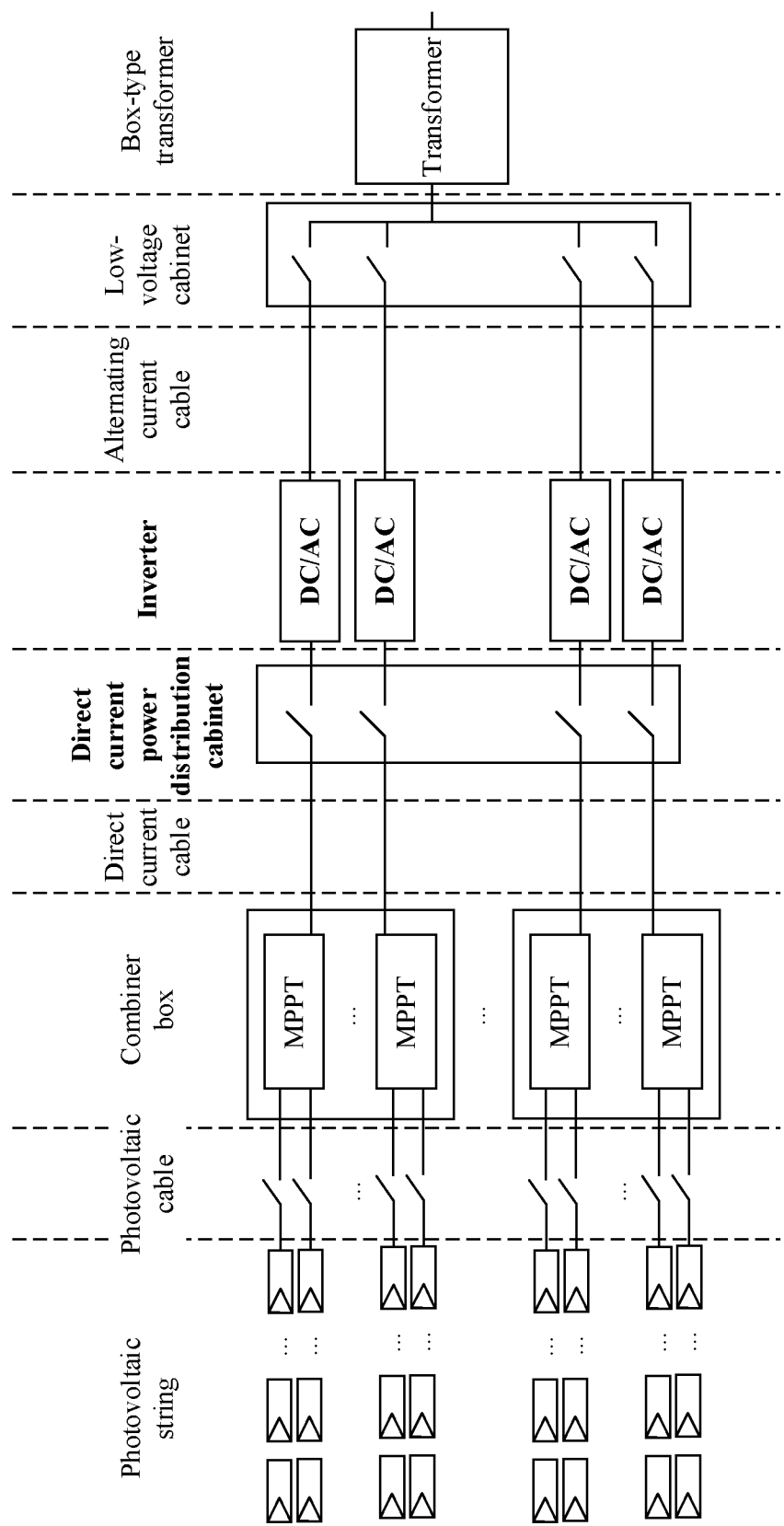
FIG. 11 is a schematic structural diagram of still another photovoltaic system according to an embodiment of this application.

FIG. 11 is a schematic structural diagram of a photovoltaic system according to an embodiment of this application.

The photovoltaic system includes a photovoltaic module, a combiner box, a direct current power distribution cabinet, an inverter, a low-voltage cabinet, a transformer, and the like.

Direct currents generated by each group of photovoltaic strings are input to one DC-DC conversion circuit. Each group of photovoltaic strings includes at least one photovoltaic string, for example, may include two to four photovoltaic strings. Photovoltaic panels in one photovoltaic string are coupled in series.

Each combiner box may include one or more DC-DC conversion circuits.

The DC-DC conversion circuit is configured to change a voltage value of a direct current. The DC-DC conversion circuit may be a boost (boost)-type DC-DC conversion circuit, or may be a buck (buck)-type DC-DC conversion circuit. In a photovoltaic power generation system, a boost (boost)-type DC-DC conversion circuit is usually used, to reduce transmission power consumption by increasing a voltage value.

During transmission of electricity of equal power, a larger voltage value indicates a smaller current value and a smaller transmission loss that is caused by a cable.

The DC-DC conversion circuits operate independently. A fault of one DC-DC conversion circuit does not affect normal operation of another DC-DC conversion circuit.

Each DC-DC conversion circuit corresponds to one DC-AC conversion circuit. Direct currents output by a plurality of DC-DC conversion circuits are transmitted to DC-AC conversion circuits corresponding to the DC-DC conversion circuits through direct current cables.

A line protection device may be disposed between each DC-DC conversion circuit and the corresponding DC-AC conversion circuit. One or more line protection devices may be located in the direct current power distribution cabinet. The line protection device may include a switch apparatus such as a circuit breaker, a diode, or a fuse.

Each combiner box outputs a direct current through a plurality of direct current cables. A current in each direct current cable is an output of a different DC-DC conversion circuit. Therefore, direct currents in the plurality of direct current cables are independent of each other. The plurality of direct current cables transmits the direct currents, thereby reducing cable costs.

A plurality of DC-AC conversion circuits is coupled to the low-voltage cabinet through alternating current cables. The low-voltage cabinet includes an alternating current bus. An alternating current output by each DC-AC conversion circuit is transmitted to the alternating current bus, that is, the low-voltage cabinet converges the alternating currents output by the plurality of DC-AC conversion circuits.

The low-voltage cabinet may further include a line protection device. The alternating current bus is coupled to an input terminal of the transformer. An alternating current obtained by the low-voltage cabinet through convergence is transmitted to a low-voltage winding of the transformer. The transformer boosts a voltage of the alternating current.

In other words, a direct current independently output by each DC-DC conversion circuit corresponds to one independent DC-AC conversion circuit. The alternating currents output by the plurality of DC-AC conversion circuits are transmitted to the low-voltage cabinet for convergence, and then a converged alternating current is transmitted to the input terminal of the transformer.

Figure 12:
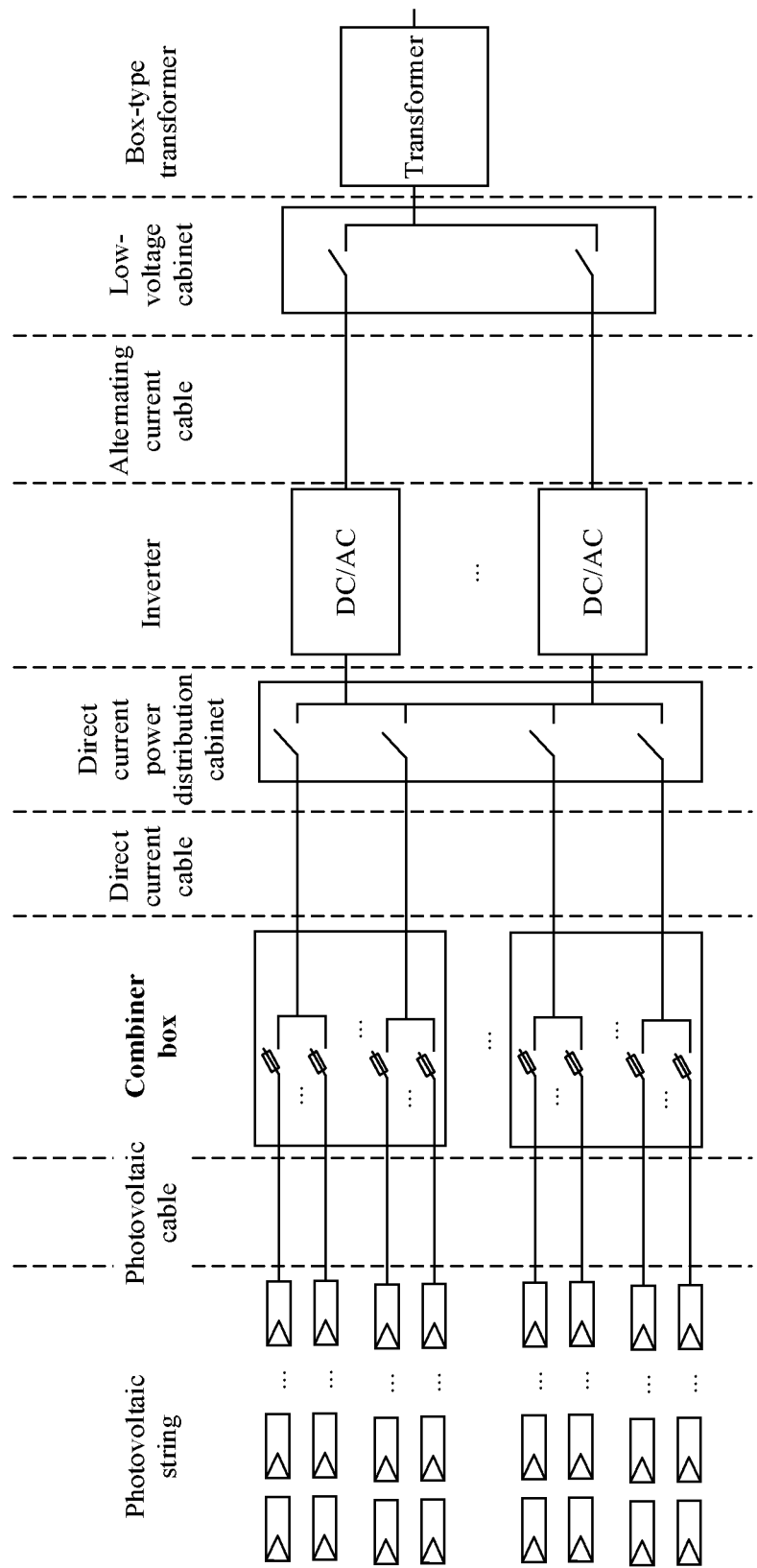
FIG. 12 is a schematic structural diagram of still another photovoltaic system according to an embodiment of this application.

FIG. 12 is a schematic structural diagram of a photovoltaic system according to an embodiment of this application.

The photovoltaic system includes a photovoltaic module, a combiner box, a direct current power distribution cabinet, an inverter, a low-voltage cabinet, a transformer, and the like.

Each combiner box may include a plurality of combiner circuits. Each combiner circuit converges direct currents of a group of photovoltaic strings, to form a direct current output corresponding to each group of photovoltaic strings in a plurality of groups of photovoltaic strings. Each photovoltaic string may be coupled to a fuse or a circuit breaker. The fuse or the circuit breaker can protect the photovoltaic string. A plurality of combiner circuits operates independently, and a fault of one combiner circuit does not affect operation of another combiner circuit.

Direct currents output by the plurality of combiner circuits are transmitted to the direct current power distribution cabinet through direct current cables. Each combiner box is coupled to the direct current power distribution cabinet through a plurality of direct current cables. A current in each direct current cable is direct current power obtained through convergence by a different group of photovoltaic strings. Therefore, direct currents in the plurality of direct current cables are independent of each other. The plurality of direct current cables transmits the direct currents, thereby reducing cable costs.

The direct current power distribution cabinet converges the direct currents again. The direct current power distribution cabinet converges the input direct currents. The direct current power distribution cabinet may converge direct currents output by one or more combiner boxes. The direct current power distribution cabinet includes a direct current bus. A direct current transmitted by each direct current cable is transmitted to the direct current bus.

The direct current power distribution cabinet may further include a line protection device. The line protection device includes a switch apparatus such as a circuit breaker, a diode, or a fuse.

The direct current power distribution cabinet transmits a direct current obtained through convergence by the direct current bus to a plurality of DC-AC conversion circuits. Some of the plurality of DC-AC conversion circuits are faulty, and another DC-AC conversion circuit operates normally, so that a total power generation capacity can be increased.

The plurality of DC-AC conversion circuits is coupled to the low-voltage cabinet through alternating current cables. The low-voltage cabinet converges alternating currents output by the plurality of DC-AC conversion circuits. The low-voltage cabinet may further include a line protection device.

An alternating current bus is coupled to an input terminal of the transformer. An alternating current obtained by the low-voltage cabinet through convergence is transmitted to a low-voltage winding of the transformer. The transformer boosts a voltage of the alternating current.

A quantity of the DC-AC conversion circuits may be equal to a quantity of groups of photovoltaic strings, or may be equal to a quantity of combiner boxes, or may be another value determined based on circuit power. This is not limited in this embodiment of this application.

It should be understood that the combiner box may not perform DC-DC conversion or MPPT. In other words, the combiner box may not include a DC-DC conversion circuit, and is used only for convergence.

Figure 13:
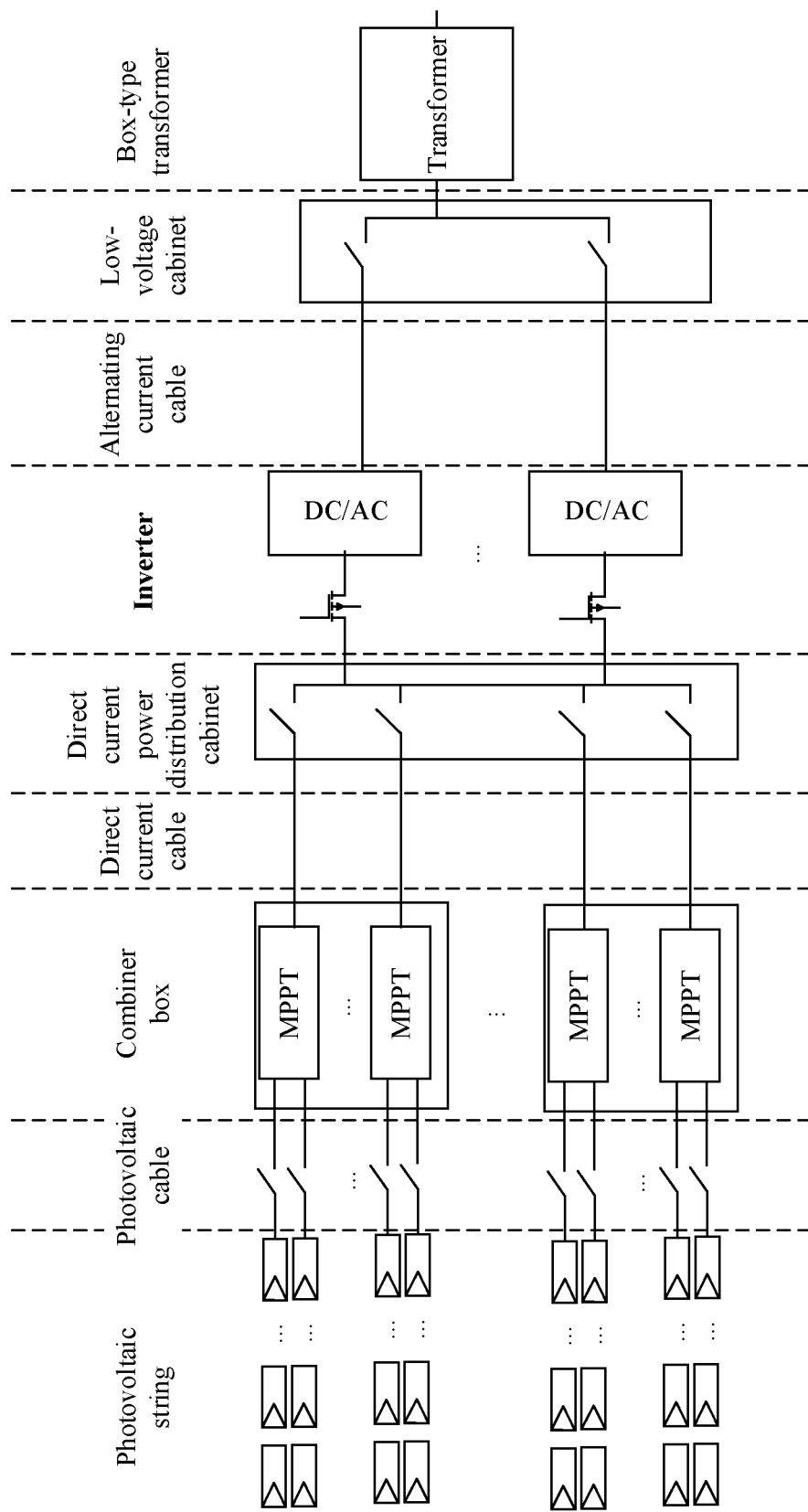
FIG. 13 is a schematic structural diagram of still another photovoltaic system according to an embodiment of this application.

FIG. 13 is a schematic structural diagram of a photovoltaic system according to an embodiment of this application.

A diode and/or a switch apparatus may be added at an input terminal of a DC-AC conversion circuit. The diode or the switch apparatus is configured to protect a circuit when a fault occurs. When there is a bus on a direct current side of the DC-AC conversion circuit or a short-circuit fault occurs in a device, the diode is disposed, or the switch apparatus is disconnected, and a current on an alternating current side of the DC-AC conversion circuit does not backflow to the direct current side.

Figure 14:
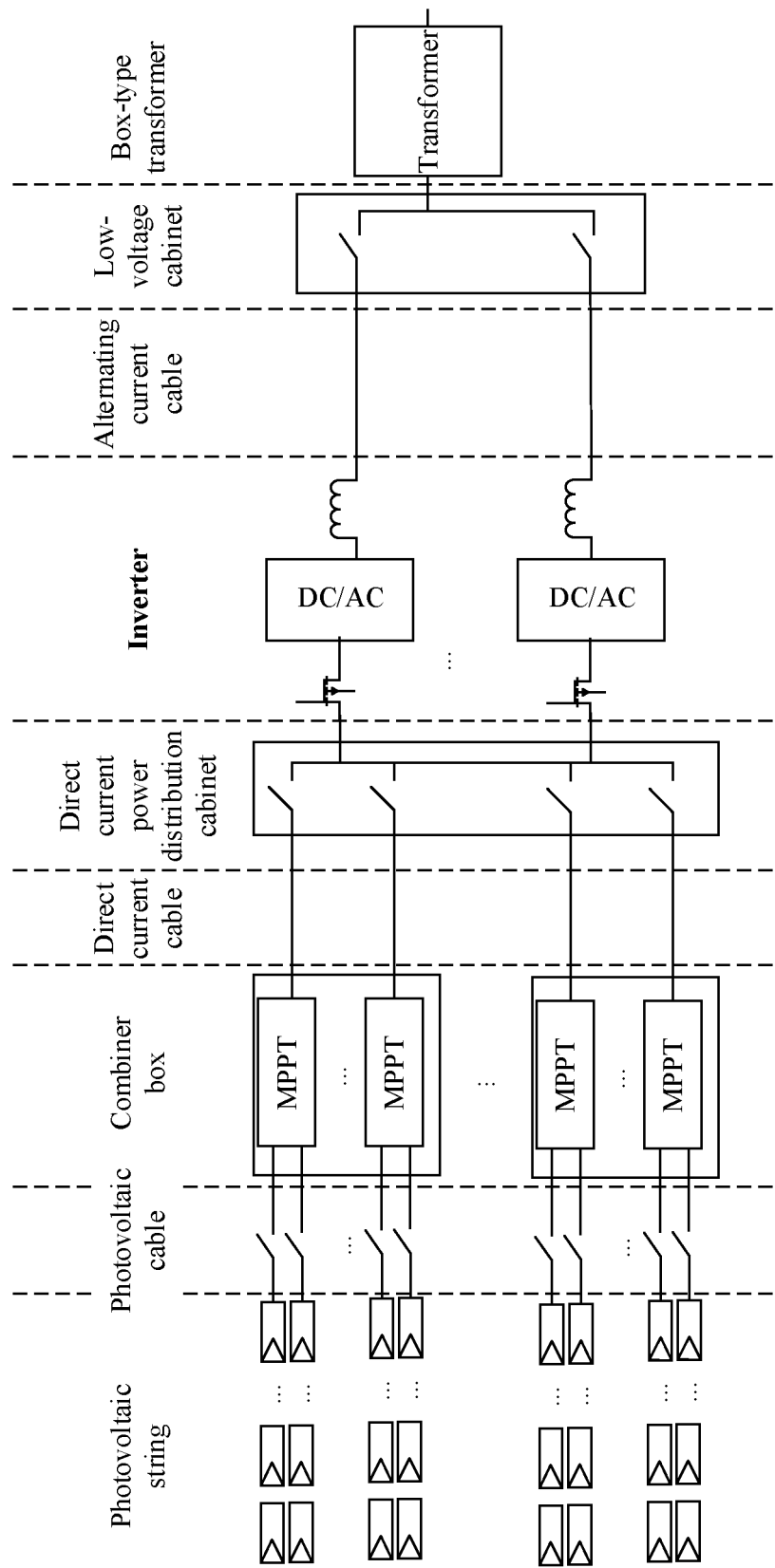
FIG. 14 is a schematic structural diagram of still another photovoltaic system according to an embodiment of this application.

FIG. 14 is a schematic structural diagram of a photovoltaic system according to an embodiment of this application.

Each DC-AC conversion circuit may be coupled to a transformer through an independent grid-connected switch. The grid-connected switch includes one or more relays.

A filter inductor may be coupled in series between the DC-AC conversion circuit and the transformer.

A plurality of DC-AC conversion circuits that transmit alternating currents to a same transformer may share a filter inductor, and the filter inductor is coupled in series between a connection point of the plurality of DC-AC conversion circuits and the transformer.

A plurality of DC-AC conversion circuits that transmit alternating currents to a same transformer may alternatively be coupled to an independent filter inductor at an output terminal of each DC-AC conversion circuit. Each filter inductor may be coupled in series between each DC-AC conversion circuit and an independent grid-connected switch corresponding to the DC-AC conversion circuit. Certainly, an independent filter inductor may alternatively be coupled between an independent grid-connected switch and a connection point of the plurality of DC-AC conversion circuits.

Figure 15:
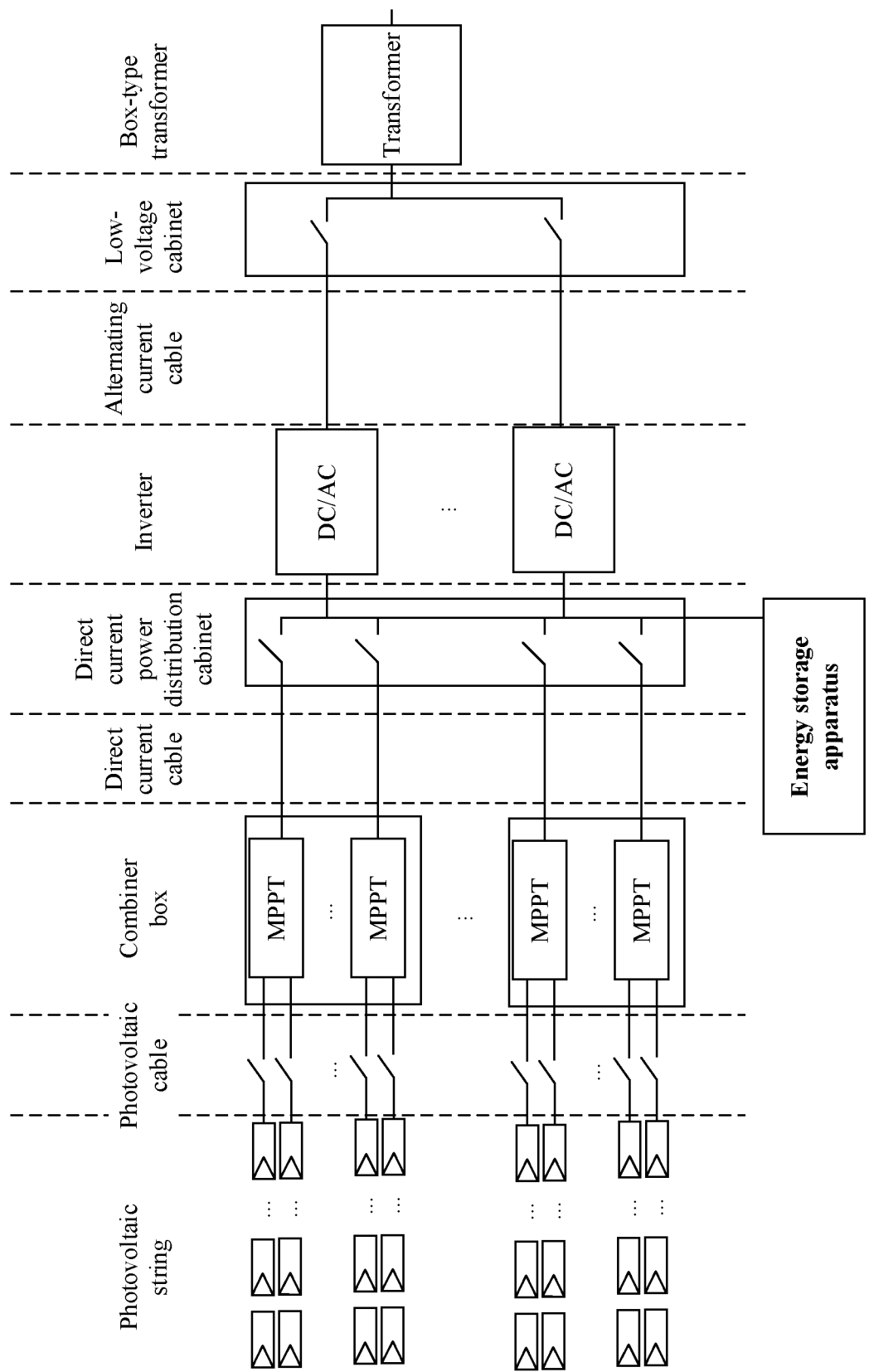
FIG. 15 is a schematic structural diagram of still another photovoltaic system according to an embodiment of this application.

FIG. 15 is a schematic structural diagram of a photovoltaic system according to an embodiment of this application.

A direct current power distribution cabinet may include a direct current bus, and the direct current bus is configured to converge a plurality of direct currents. The direct current bus is coupled to an input terminal of at least one DC-AC conversion circuit. A direct current on the direct current bus is transmitted to the at least one DC-AC conversion circuit. Each DC-AC conversion circuit is configured to convert the direct current to an alternating current.

The direct current bus may be coupled to an energy storage module. The energy storage module may include an energy storage battery. The energy storage battery is configured to store electric energy. The energy storage module may further include a DC-DC conversion circuit. The DC-DC conversion circuit is configured to convert a voltage value of the direct current, so that when the energy storage battery is charged, a voltage of the direct current bus matches a voltage of the energy storage battery, and/or when the energy storage battery is discharged, a voltage value of a direct current output by the energy storage battery matches the direct current bus.

When total output power of a combiner box is greater than total input power of a plurality of DC-AC conversion circuits, the energy storage module may store electric energy, charge the energy storage battery, and store remaining power in an energy storage apparatus. When total output power of the combiner box is greater than a maximum total input power value of a plurality of DC-AC conversion circuits, the energy storage module may release electric energy and discharge the energy storage battery, thereby improving operation efficiency of an inverter and improving system efficiency. A control system may control charging and discharging processes of the energy storage battery.

The DC-AC conversion circuit may operate bi-directionally. The DC-AC conversion circuit may operate forwardly to convert a direct current into an alternating current. The DC-AC conversion circuit may alternatively operate reversely to convert an alternating current into a direct current. The control system may control turn-on and turn-off of a switch transistor in the DC-AC conversion circuit, and control operation of the DC-AC conversion circuit. When the DC-AC conversion circuit does not invert or convert a direct current, for example, when no electric energy is generated by a photovoltaic module at night, the DC-AC conversion circuit may operate reversely to rectify an alternating current.

If there is remaining electric energy provided for use by a user in a power grid, the remaining electric energy may also be stored in the energy storage battery. A transformer may reduce a voltage of an alternating current in the power grid, and transmit the alternating current to an output terminal of the DC-AC conversion circuit. The DC-AC conversion circuit may operate reversely to rectify the alternating current at the output terminal to convert the alternating current into a direct current, and transmit the direct current to the direct current bus. The direct current bus may charge the energy storage apparatus.

Figure 16:
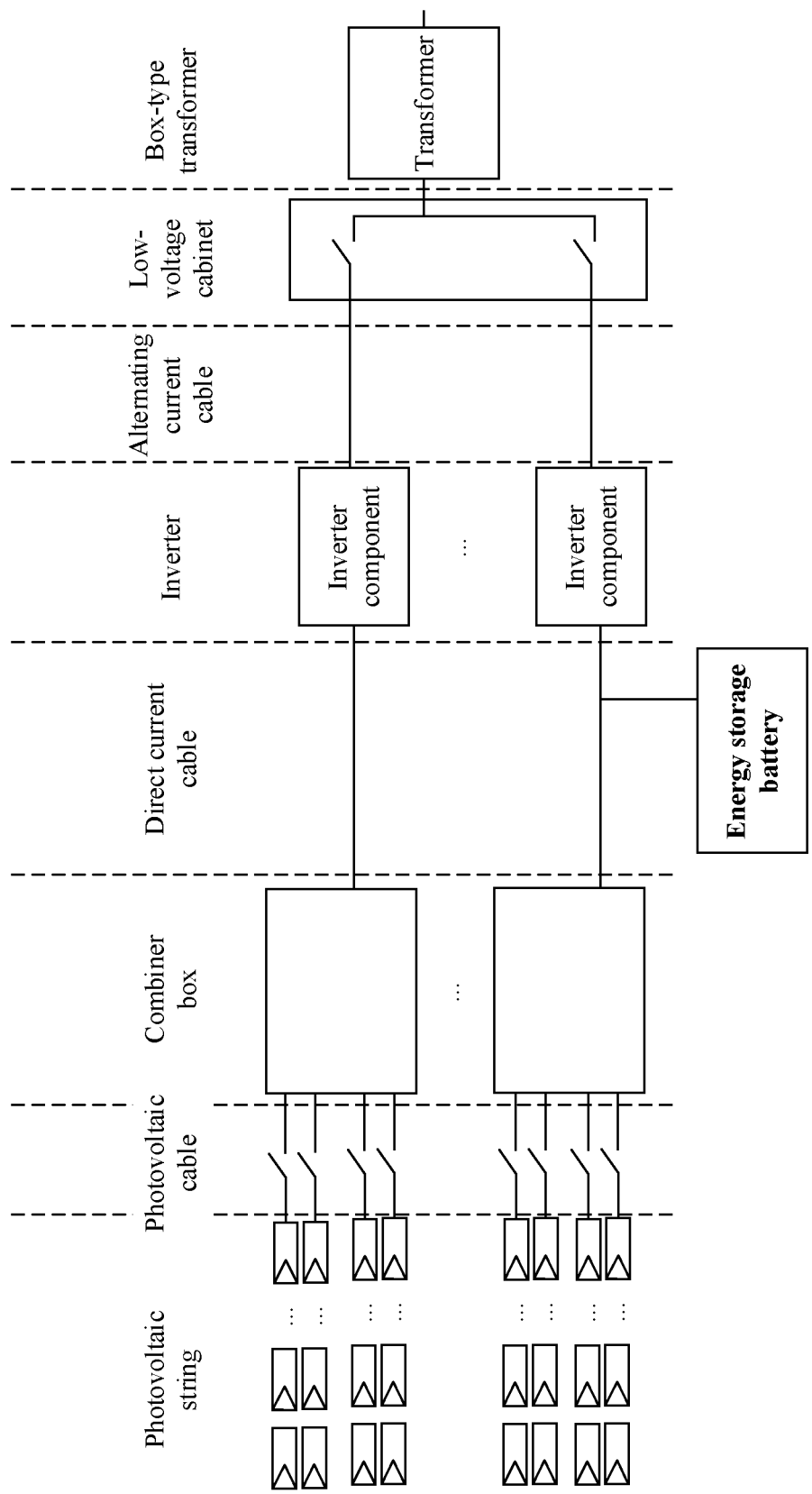
FIG. 16 is a schematic structural diagram of still another photovoltaic system according to an embodiment of this application.

FIG. 16 is a schematic structural diagram of a photovoltaic system according to an embodiment of this application.

A combiner box converges direct currents generated by photovoltaic strings. The combiner box converges a plurality of direct current inputs to form one or more direct current outputs. A quantity of the direct current outputs is greater than a quantity of the direct current inputs.

The combiner box includes one or more output ports. Output ports are in a one-to-one correspondence with direct current outputs. The direct current output is transmitted to an inverter component corresponding to the direct current output through a direct current cable.

One or more inverter components may be located in one inverter device.

Output terminals of the plurality of inverter components are coupled to a transmission node, and the transmission node may be located in a low-voltage cabinet. The low-voltage cabinet is configured to converge alternating currents output by the plurality of inverter components.

A transformer converts a voltage of a converged alternating current. Usually, the transformer boosts the voltage of the converged alternating current. An output terminal of the transformer may be coupled to a power grid.

A direct current terminal of the inverter component may be coupled to an energy storage battery or another energy storage apparatus.

If electric energy is preferentially provided for the transformer, when power generated by a photovoltaic module is greater than maximum conversion power of the inverter component, remaining power that is of the inverter component after electric energy conversion and that is in the power generated by the photovoltaic module may be stored in the energy storage battery.

When the energy storage battery is preferentially charged, the energy storage battery may store the direct current converged by the combiner box. In addition, the energy storage battery may further store a direct current output at the direct current terminal of the inverter component coupled to the energy storage battery after the inverter component operates reversely to rectify an alternating current at the output terminal.

The inverter component may operate forwardly, and invert the direct current at the direct current terminal, to output an alternating current at an alternating current terminal. Alternatively, the inverter component may operate reversely to rectify an alternating current at the direct current terminal, to output a direct current at the direct current terminal.

The transformer may operate forwardly to adjust a voltage of an alternating current generated by the inverter component, and input the alternating current to an alternating current grid. The transformer may alternatively operate reversely to adjust a voltage of an alternating current in an alternating current grid, and transmit the alternating current to an alternating current terminal of an inverter.

The energy storage battery is coupled to direct current input terminals of some inverters.

Before the inverter component, direct currents output by a plurality of output ports of the combiner box are not converged, and electric energy transmission power of each inverter component is equal to power of a direct current output of an output terminal of one output port of the combiner box. Therefore, a maximum operating power value of the inverter component is relatively small.

The energy storage battery may be coupled to direct current input terminals of some inverters.

The inverter operates reversely, and a source of an alternating current may include an alternating current obtained from an alternating current power grid through reverse operation of the transformer, or may include an alternating current that is transmitted to an alternating current node and that is obtained after another inverter component operates forwardly to convert a direct current generated by a photovoltaic string.

A maximum operating power value of each inverter component is relatively small. Therefore, a power storage battery is coupled to direct current sides of some alternating current modules, so that charging efficiency for each power storage battery can be improved, a quantity of power storage batteries in a photovoltaic system can be reduced, and costs can be reduced.

Figure 17:
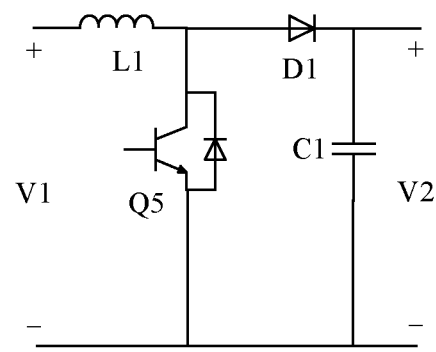
FIG. 17 is a schematic structural diagram of a boost-type DC-DC conversion circuit.

FIG. 17 is a schematic structural diagram of a boost-type DC-DC conversion circuit.

A boost (boost)-type DC-DC converter includes an inductor L1, a diode D1, a switch transistor Q5, and an output capacitor C1. A first terminal of the inductor L1 is configured to receive an input voltage V1. A second terminal of the inductor L1, an anode of the diode D1, and a first terminal of the switch transistor Q5 are coupled. A cathode of the diode D1 is coupled to a first terminal of the output capacitor C1. A second terminal of the output capacitor C1 and a second terminal of the switch transistor Q5 are grounded. The input voltage V1 is a direct current voltage. A voltage at both the ends of the output capacitor C1 is an output voltage V2.

When the switch transistor Q5 is turned on, the switch transistor Q5 short-circuits the capacitor and the diode, and a power supply charges the inductor. When the switch transistor Q5 is turned off, the inductor discharges, and the inductor and the power supply jointly charge the capacitor.

A ratio of the output voltage V2 of the DC-DC converter to the input voltage V1 of the DC-DC converter may be changed by adjusting a duty cycle of the switch transistor Q5.

Figure 18:
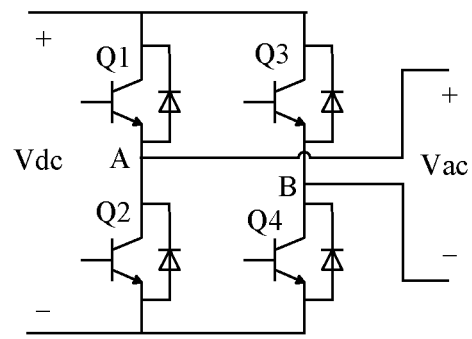
FIG. 18 is a schematic structural diagram of a DC-AC conversion circuit.

FIG. 18 is a schematic structural diagram of a DC-AC conversion circuit.

The DC-AC conversion circuit may also be referred to as an inverter unit or an inverter circuit. Each inverter unit has an independent alternating current output. The DC-AC conversion circuit may convert a direct current input into a single-phase alternating current or a multi-phase alternating current, for example, may convert the direct current input into a three-phase alternating current, so that the three-phase alternating current can be converted into mains. A DC-AC conversion circuit that converts a direct current input into a single-phase alternating current may be referred to as a single-phase DC-AC conversion circuit. A DC-AC conversion circuit that converts a direct current input into a multi-phase alternating current may be referred to as a multi-phase DC-AC conversion circuit. FIG. 18 uses a single-phase DC-AC conversion circuit as an example for description.

The DC-AC conversion circuit includes a switch transistor Q1 to a switch transistor Q4. First ends of the switch transistor Q1 and the switch transistor Q3 are coupled to a positive electrode of an input voltage Vdc, and first ends of the switch transistor Q2 and the switch transistor Q4 are coupled to a negative electrode of the input voltage Vdc. A connection point between the second terminal of the switch transistor Q1 and the second terminal of the switch transistor Q2 is a node A. A connection point between the second terminal of the switch transistor Q3 and the second terminal of the switch transistor Q4 is a node B. A voltage Vac between the node A and the node B may be used as an output voltage of the DC-AC converter.

The switch transistor Q1 and the switch transistor Q4 are turned on and turned off at the same time. The switch transistor Q2 and the switch transistor Q3 are turned on and turned off at the same time. When the switch transistor Q1 and the switch transistor Q4 are in a turned-on state, the switch transistor Q2 and the switch transistor Q3 are in a turned-off state. When the switch transistor Q2 and the switch transistor Q3 are in the turned-on state, the switch transistor Q1 and the switch transistor Q4 are in the turned-off state.

The DC-AC conversion circuit may invert a direct current voltage Vdc at an input terminal, and output an alternating current voltage Vac. The DC-AC conversion circuit may also reversely operate to rectify the alternating current voltage Vac and output the direct current voltage Vdc.

In the embodiments of this application, "at least one" means one or more, and "a plurality of" means two or more. The term "and/or" describes an association relationship for describing associated objects and represents those three relationships may exist. For example, A and/or B may represent the following three cases: Only A exists, both A and B exist, and only B exists. A and B may be singular or plural. The character "/" generally indicates an "or" relationship between the associated objects. "At least one of the following" and similar expressions mean any combination of these items, including a single item or any combination of a plurality of items. For example, at least one of a, b, or c may indicate: a, b, c, a and b, a and c, b and c, or a, b, and c, where a, b, and c may be a single item, or may be a plurality of items. It may be clearly understood by a person skilled in the art that, for the purpose of convenient and brief description, for a detailed working process of the foregoing system, apparatus, and unit, refer to a corresponding process in the foregoing method embodiments, and details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random-access memory (Random Access Memory, RAM), a magnetic disk, or an optical disc.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A photovoltaic system, comprising:
a plurality of photovoltaic strings, wherein each of the plurality of photovoltaic strings comprises a photovoltaic string direct current (DC) output terminal;
a junction device, connected to photovoltaic string DC output terminals of at least two of the plurality of photovoltaic strings and comprising a plurality of input terminals and at least two output terminals, wherein the junction device is configured to output at least two mutually independent DC outputs by converging a power from the plurality of input terminals of the junction device to the at least two output terminals of the junction device, a quantity of the plurality of input terminals of the junction device is greater than a quantity of the at least two output terminals of the junction device;
a direct current power distribution cabinet comprising a plurality of first switches and a direct current bus, wherein input terminals of the plurality of first switches are coupled to respective output terminals of the junction device and output terminals of the plurality of first switches are coupled to the direct current bus; and
at least one inverter, coupled to the direct current bus of the direct current power distribution cabinet and configured to convert DC from the direct current bus into an alternating current (AC);
wherein the at least one inverter comprises a plurality of DC-AC conversion circuits coupled to the direct current bus, charging and discharging process of the energy storage apparatus is controlled by a control system based on total input power of the plurality of DC-AC conversion circuits and maximum total input power value of the plurality of DC-AC conversion circuits, and
wherein the charging and discharging process comprises:
when total output power of the junction device is greater than the total input power of the plurality of DC-AC conversion circuits, the energy storage apparatus is configured to charge an energy storage battery of the energy storage apparatus; and
when the total output power of the junction device is greater than the maximum total input power value of the plurality of DC-AC conversion circuits, the energy storage apparatus is configured to discharge the energy storage battery.

2. The photovoltaic system according to claim 1, wherein the junction device comprises at least one DC-DC conversion circuit, and each DC-DC conversion circuit is connected to a first direct current output terminal of at least one photovoltaic string of the plurality of photovoltaic strings, and is configured to perform DC-DC conversion on at least one first direct current.

3. The photovoltaic system according to claim 1, wherein the energy storage apparatus coupled to the direct current bus and configured to store direct current from the direct current power distribution cabinet or direct current from a direct current terminal of the at least one inverter.

4. The photovoltaic system according to claim 3, wherein the at least one inverter further comprises a plurality of second switches between the direct current bus and the plurality of DC-AC conversion circuits, respectively, the plurality of second switches are controlled by a control system to turn-on or turn-off such that a DC-AC conversion circuit of the plurality of DC-AC conversion circuits operates to convert a direct current from the junction device or operates reversely to rectify an AC.

5. The photovoltaic system according to claim 1, wherein the photovoltaic system further comprises a low-voltage cabinet including a plurality of third switches, each of the plurality of third switches is disposed between one of the plurality of DC-AC conversion circuits and a transformer.

6. A photovoltaic system, comprising:
a plurality of photovoltaic strings each comprising a photovoltaic string direct current (DC) output terminal;
a first combiner box comprising a first group of DC-DC conversion circuits, wherein each DC-DC conversion circuit comprises a group of input terminals coupled to respective photovoltaic string DC output terminals and one output terminal, and each DC-DC conversion circuit is configured to output a DC output by converging power from the respective photovoltaic string DC output terminals;
a direct current power distribution cabinet comprising a first group of first switches and a first direct current bus, wherein input terminals of the first group of first switches are coupled to respective output terminals of the first group of DC-DC conversion circuits and output terminals of the first group of first switches are coupled to the first direct current bus;
an inverter coupled to the first direct bus and comprising a first DC-AC conversion circuit for converting DC into alternating current (AC);
wherein the photovoltaic system further comprises an energy storage apparatus coupled to the first direct current bus and configured to store direct current from the direct current power distribution cabinet or direct current from a direct current terminal of the inverter; and
wherein charging and discharging process of the energy storage apparatus is controlled by a control system based on total input power of a plurality of DC-AC conversion circuits and maximum total input power value of the plurality of DC-AC conversion circuits, and the charging and discharging process comprises:
when total output power of the first combiner box is greater than the total input power of the plurality of DC-AC conversion circuits, the energy storage apparatus is configured to charge an energy storage battery of the energy storage apparatus; and
when the total output power of the first combiner box is greater than the maximum total input power value of the plurality of DC-AC conversion circuits, the energy storage apparatus is configured to discharge the energy storage battery.

7. The photovoltaic system according to claim 6, wherein the photovoltaic system further comprises a second combiner box including a second group of DC-DC conversion circuits;
the direct current power distribution cabinet further comprises a second group of first switches and a second direct current bus, wherein input terminals of the second group of first switches are coupled to respective output terminals of the second group of DC-DC conversion circuits and output terminals of the first group of first switches are coupled to the second direct current bus; and
the inverter further comprises a second DC-AC conversion circuit coupled to the second direct current bus.

8. The photovoltaic system according to claim 6, wherein the inverter further comprises a second switch between the first direct current bus and the first DC-AC conversion circuit, the second switch is controlled by a control system to turn-on or turn-off such that the first DC-AC conversion circuit operates to convert a direct current from the first combiner box or operates reversely to rectify an AC.

9. The photovoltaic system according to claim 6, wherein the photovoltaic system further comprises a low-voltage cabinet including a third switch and a fourth switch, the third switch is disposed between the first DC-AC conversion circuit and a transformer, and the fourth switch is disposed between a second DC-AC conversion circuit and the transformer.

* * * * *